United States Patent
Zhang et al.

(10) Patent No.: US 11,151,384 B2
(45) Date of Patent: *Oct. 19, 2021

(54) METHOD AND APPARATUS FOR OBTAINING VEHICLE LOSS ASSESSMENT IMAGE, SERVER AND TERMINAL DEVICE

(71) Applicant: ADVANCED NEW TECHNOLOGIES CO., LTD., Grand Cayman (KY)

(72) Inventors: Haitao Zhang, Hangzhou (CN); Jinlong Hou, Hangzhou (CN); Xin Guo, Hangzhou (CN); Yuan Cheng, Hangzhou (CN); Jian Wang, Hangzhou (CN); Juan Xu, Hangzhou (CN); Fan Zhou, Hangzhou (CN); Kan Zhang, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 62 days.

This patent is subject to a terminal disclaimer.

(21) Appl. No.: 16/655,001

(22) Filed: Oct. 16, 2019

(65) Prior Publication Data

US 2020/0050867 A1 Feb. 13, 2020

Related U.S. Application Data

(63) Continuation of application No. PCT/CN2018/084760, filed on Apr. 27, 2018.

(30) Foreign Application Priority Data

Apr. 28, 2017 (CN) .......................... 201710294010.4

(51) Int. Cl.
*G06K 9/00* (2006.01)
*G06T 7/70* (2017.01)

(52) U.S. Cl.
CPC ............ *G06K 9/00718* (2013.01); *G06T 7/70* (2017.01); *G06T 2207/10016* (2013.01); *G06T 2207/30252* (2013.01)

(58) Field of Classification Search
CPC combination set(s) only.
See application file for complete search history.

(56) References Cited

U.S. PATENT DOCUMENTS 8,510,196 B1 8/2013 Brandmaier et al.
8,712,893 B1 4/2014 Brandmaier et al.
(Continued)

FOREIGN PATENT DOCUMENTS

CN 105719188 A 6/2016
CN 106127747 A 11/2016
(Continued)

OTHER PUBLICATIONS

Office Action for Japanese Application No. 2019-558552 dated Oct. 20, 2020.
(Continued)

*Primary Examiner* — Omar S Ismail

(57) ABSTRACT

Embodiments of the application provide a method, apparatus, server, and terminal device for obtaining a vehicle loss assessment image. A computer-implemented method for obtaining a vehicle loss assessment image comprises: receiving video data of a damaged vehicle; detecting one or more video images in the video data to identify a damaged portion in the one or more video images; classifying the one or more video images into one or more candidate image classification sets of the damaged portion based on the identified damaged portion; and selecting a vehicle loss assessment image from the one or more candidate image classification sets according to a screening condition.

20 Claims, 9 Drawing Sheets

(56) References Cited

U.S. PATENT DOCUMENTS

| | | | |
|---|---|---|---|
| 10,529,028 | B1 | 1/2020 | Davis et al. |
| 2007/0061109 | A1* | 3/2007 | Wilke .................... G06Q 10/10 702/183 |
| 2013/0022231 | A1 | 1/2013 | Nepomniachtchi et al. |
| 2013/0262156 | A1 | 10/2013 | Ketzef |
| 2013/0297353 | A1 | 11/2013 | Strange et al. |
| 2014/0114691 | A1* | 4/2014 | Pearce ................ G06Q 50/265 705/4 |
| 2014/0229207 | A1* | 8/2014 | Swamy ................ G06Q 40/08 705/4 |
| 2015/0106133 | A1 | 4/2015 | Smith, Jr. |
| 2015/0278605 | A1 | 10/2015 | Seo et al. |
| 2016/0140778 | A1 | 5/2016 | Bailly et al. |
| 2017/0293894 | A1* | 10/2017 | Taliwal ............... G06K 9/00671 |
| 2017/0337753 | A1 | 11/2017 | Joodaki et al. |
| 2018/0082379 | A1 | 3/2018 | Kelsh et al. |
| 2018/0182039 | A1 | 6/2018 | Wang et al. |
| 2018/0232964 | A1* | 8/2018 | Chen .................... G07C 5/0808 |
| 2019/0073695 | A1 | 3/2019 | Wasserman et al. |
| 2019/0222994 | A1 | 7/2019 | Florey et al. |
| 2019/0294878 | A1* | 9/2019 | Endras .................... G06K 9/22 |

FOREIGN PATENT DOCUMENTS

| | | |
|---|---|---|
| CN | 106600421 A | 4/2017 |
| CN | 106600422 A | 4/2017 |
| CN | 107194323 A | 9/2017 |
| CN | 105719188 B | 12/2017 |
| EP | 3520045 A1 | 8/2019 |
| JP | H9-81739 A | 3/1997 |
| JP | 2001-188906 A | 7/2001 |
| JP | 2016-532923 A | 10/2016 |
| JP | 2018-537772 A | 12/2018 |
| KR | 10-2015-0112535 A | 10/2015 |
| KR | 10-2016-0082339 A | 7/2016 |
| KR | 10-2016-0134001 A | 11/2016 |
| KR | 10-2016-0134401 A | 11/2016 |
| WO | 2017/055878 A1 | 4/2017 |
| WO | 2018191437 A1 | 10/2018 |

OTHER PUBLICATIONS

Search Report for European Application No. 18791520.2 dated Mar. 3, 2020.

VideoGorillas, "Augmented reality for precise car damage inspection," Youtube, Oct. 22, 2013.

Jiebo Luo et al., "Efficient Mobile Imaging Using Emphasis Image Selection", Jan. 1, 2003.

Examination Report for European Application No. 18791520.2 dated Apr. 1, 2020.

First Search for Chinese Application No. 201710294010.4 dated Jul. 31, 2019 (1 page).

First Office Action for Chinese Application No. 201710294010.4 dated Aug. 7, 2019 with English machine translation (11 pages).

Non-final rejection and Search Report for Taiwanese Application No. 107108570 dated Jun. 5, 2019 (7 pages).

Written Opinion of the International Searching Authority and International Search Report for PCT Application No. PCT/CN2018/084760 dated Jul. 2, 2018 (14 pages).

International Preliminary Report on Patentability Chapter I for PCT Application No. PCT/CN2018/084760 dated Nov. 7, 2019 (12 pages).

Second Office Action of Chinese Application No. 201710294010.4 dated Feb. 3, 2020, (12 Pages).

Office Action for Korean Application No. 10-2019-7033366 dated Apr. 8, 2021.

\* cited by examiner

METHOD AND APPARATUS FOR OBTAINING VEHICLE LOSS ASSESSMENT IMAGE, SERVER AND TERMINAL DEVICE

CROSS-REFERENCE TO RELATED APPLICATIONS

The present application is a continuation application of International Patent Application No. PCT/CN2018/084760, filed on Apr. 27, 2018, which is based on and claims priority to the Chinese Patent Application No. 201710294010.4, filed on Apr. 28, 2017 and entitled "METHOD AND APPARATUS FOR OBTAINING VEHICLE LOSS ASSESSMENT IMAGE, SERVER AND TERMINAL DEVICE." The above-referenced applications are incorporated herein by reference in their entirety.

TECHNICAL FIELD

This application relates to the field of computer image data processing technologies, and in particular, to a method, apparatus, server, and terminal device for obtaining a vehicle loss assessment image.

BACKGROUND

After a traffic accident of a vehicle occurs, if the vehicle makes an insurance claim to its insurance company, the insurance company needs several loss assessment images to perform loss assessment and verification for the vehicle, and also to archive documents of the insurance claim.

At present, vehicle loss assessment images are generally obtained through photographing by an operator on the scene, and then vehicle loss assessment processing is performed according to the photographs taken on the scene. The vehicle loss assessment images need to clearly reflect information of, e.g., a damaged portion, a damaged component, a damage type, and a damage degree of a vehicle. Generally, a photographer is required to be acquainted with professional vehicle loss assessment-related knowledge to be able to photograph an image satisfying loss assessment processing requirements. This obviously requires relatively high costs in manpower training and experience accumulation on loss assessment processing. In addition, there are some situations in which a vehicle needs to be evacuated or moved as soon as possible after a traffic accident, however it takes a relatively long time for an insurance company operator to arrive at the scene of the accident. Moreover, if a vehicle owner takes the initiative to take photos or takes photos at a request of the insurance company operator to obtain some original loss assessment images, because the vehicle owner is not professional, the loss assessment images obtained by the vehicle owner often do not satisfy the loss assessment image processing requirements. In addition, images photographed by the operator on the scene often need to be exported from a photographing device subsequently and manually screened to determine qualified loss assessment images. This also requires a relatively large amount of manpower and time, thereby reducing efficiency of obtaining the final loss assessment images required for loss assessment processing.

Existing manners of obtaining loss assessment images by an insurance company operator or a vehicle owner requires professional vehicle loss assessment-related knowledge. Manpower and time costs are relatively high, and efficiency of obtaining loss assessment images satisfying the loss assessment processing requirements is relatively low.

SUMMARY

An objective of the specification is to provide a method, apparatus, server, and terminal device for obtaining a vehicle loss assessment image, to quickly generate high-quality loss assessment images satisfying loss assessment processing requirements through video recording, performed by a photographer, of a damaged portion of a damaged vehicle, thereby improving loss assessment image obtaining efficiency and facilitating the operation of an operator.

A method for obtaining a vehicle loss assessment image may comprise: receiving video data of a damaged vehicle; detecting one or more video images in the video data to identify a damaged portion in the one or more video images; classifying the one or more video images into one or more candidate image classification sets of the damaged portion based on the identified damaged portion; and selecting a vehicle loss assessment image from the one or more candidate image classification sets according to a screening condition.

In some embodiments, the one or more determined candidate image classification sets comprises: a close-up image set including one or more video images displaying the damaged portion and a component image set including one or more video images displaying a vehicle component to which the damaged portion belongs.

In some embodiments, classifying one or more video images into the close-up image set comprises: in response to determining that a ratio of an area of the damaged portion to that of a video image including the damaged portion is greater than a first preset ratio, classifying the video image into the close-up image set.

In some embodiments, classifying one or more video images into the close-up image set comprises: in response to determining that a ratio of a horizontal coordinate span of the damaged portion to a length of a video image including the damaged portion is greater than a second preset ratio, and/or a ratio of a longitudinal coordinate span of the damaged portion to a height of the video image including the damaged portion is greater than a third preset ratio, classifying the video image into the close-up image set.

In some embodiments, classifying one or more video images into the close-up image set comprises: sorting video images including the damaged portion in a descending order of areas of the same damaged portion in the video images; and selecting, from the sorted video images, first one or more video images or one or more video images in each of which a ratio of an area of the corresponding damaged portion to that of the video image is greater than a fourth preset ratio.

In some embodiments, the method may further comprise: in response to detecting that at least one of the close-up image set and the component image set of the damaged portion is empty, or the one or more video images in the close-up image set do not cover the entire damaged portion, generating a video recording prompt message; and sending the video recording prompt message to the terminal device.

In some embodiments, the method may further comprise: tracking the damaged portion in the video data in real time to determine a region of the damaged portion in the video images; and in response to the damaged portion being out of a video image and subsequently re-entering a video image, tracking the damaged portion again to determine a new region of the damaged portion in the video image based on image feature data of the damaged portion.

In some embodiments, the method may further comprise: sending information of the region of the tracked damaged portion to a terminal device for the terminal device to display the region of the damaged portion in real time.

In some embodiments, the method may further comprise: receiving new information of the damaged portion, wherein the new information of the damaged portion is determined in response to the terminal device's changing the region of the damaged portion based on a received interactive instruction; and classifying the video images based on the new information of the damaged portion.

In some embodiments, selecting a vehicle loss assessment image from the one or more candidate image classification sets according to a screening condition comprises: selecting at least one video image as a loss assessment image of the damaged portion from the one or more candidate image classification sets according to clarity of the video images and filming angles of the damaged portion in the video images.

In some embodiments, the method further comprise: in response to detecting that there are at least two damaged portions in the one or more video images, determining whether a distance between the at least two damaged portions satisfies a proximity condition; and in response to determining that the distance between the at least two damaged portions satisfies the proximity condition, simultaneously tracking the at least two damaged portions, and obtaining loss assessment images of the at least two damaged portions respectively.

An apparatus for obtaining a vehicle loss assessment image may comprise: one or more processors and one or more non-transitory computer-readable memories coupled to the one or more processors and configured with instructions executable by the one or more processors to cause the apparatus to perform operations comprising: receiving video data of a damaged vehicle; detecting one or more video images in the video data to identify a damaged portion in the one or more video images; classifying the one or more video images into one or more candidate image classification sets of the damaged portion based on the identified damaged portion; and selecting a vehicle loss assessment image from the one or more candidate image classification sets according to a screening condition.

A non-transitory computer-readable storage medium may be configured with instructions executable by one or more processors to cause the one or more processors to perform operations comprising: receiving video data of a damaged vehicle; detecting one or more video images in the video data to identify a damaged portion in the one or more video images; classifying the one or more video images into one or more candidate image classification sets of the damaged portion based on the identified damaged portion; and selecting a vehicle loss assessment image from the one or more candidate image classification sets according to a screening condition.

The method, apparatus, and non-transitory computer-readable storage medium for obtaining a vehicle loss assessment image provided in the specification propose a solution of generating a video-based vehicle loss assessment image. A photographer may perform video recording of a damaged vehicle by using the terminal device, and captured video data may be transmitted to the server of a system, and then the server analyzes the video data, identifies a damaged portion, and obtains, according to the damaged portion, different types of candidate images required for loss assessment. Then, a loss assessment image of the damaged vehicle may be generated from the candidate images. According to the implementations of this application, high-quality loss assessment images satisfying loss assessment processing requirements can be quickly obtained, thereby improving efficiency of obtaining loss assessment images, and also reducing costs of obtaining and processing loss assessment images by insurance company operators.

BRIEF DESCRIPTION OF THE DRAWINGS

To describe the technical solutions in the embodiments of the specification more clearly, accompanying drawings for describing the embodiments are briefly described below. Obviously, the accompanying drawings in the following description show merely some embodiments of the specification, and a person of ordinary skill in the art may still derive other drawings from these accompanying drawings without creative efforts.

DETAILED DESCRIPTION OF THE INVENTION

To make a person skilled in the art better understand the technical solutions of the specification, the technical solutions in the embodiments of the specification are further described below with reference to the accompanying drawings. Obviously, the described embodiments are merely some rather than all of the embodiments of the specification. All other embodiments obtained by a person of ordinary skill in the art based on the embodiments of the specification without creative efforts shall fall within the protection scope of the application.

Figure 1:
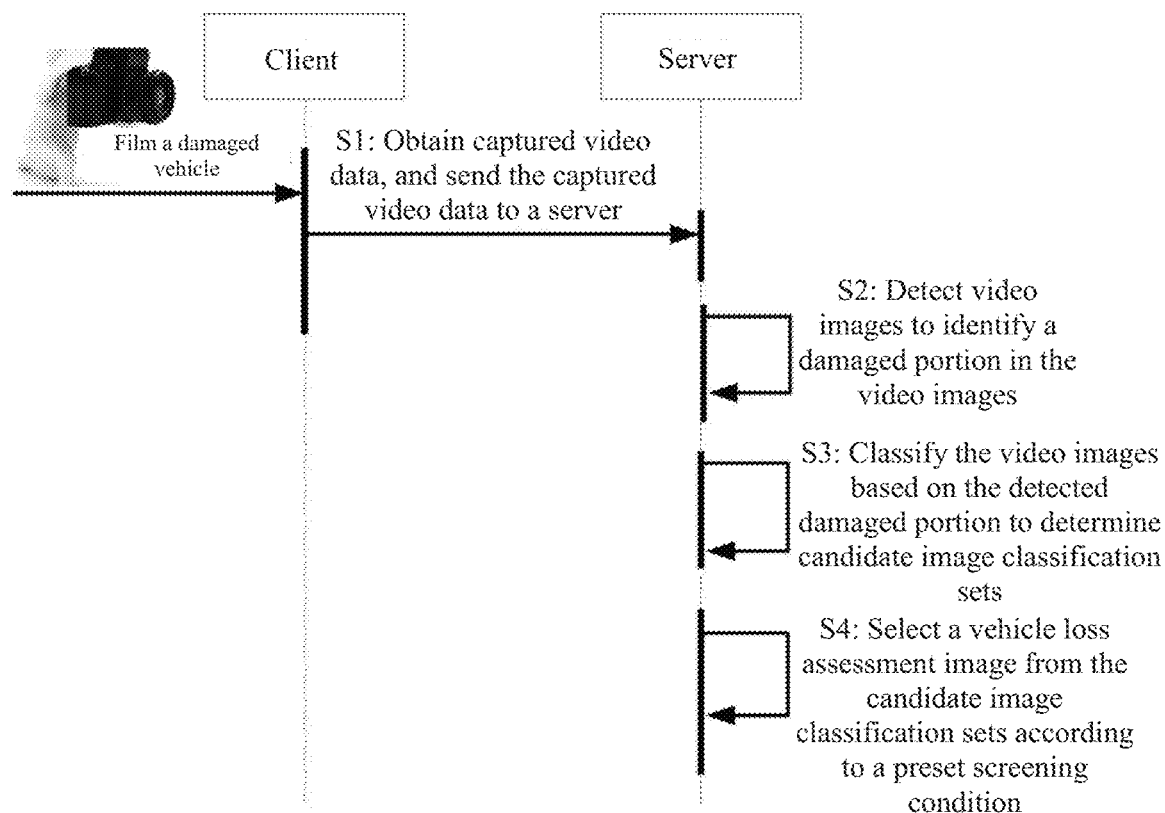
FIG. 1 is a schematic flowchart of a method for obtaining a vehicle loss assessment image according to some embodiments of the specification.

FIG. 1 is a schematic flowchart of a method for obtaining a vehicle loss assessment image according to some embodiments of the specification. The specification provides method steps or apparatus modules shown in the following embodiments or accompany drawings. In some embodiments, additional steps of the methods or additional modules of the apparatuses may be included in the methods or the apparatuses without creative efforts. In other embodiments, fewer steps or modules may be included in the methods or the apparatuses without creative efforts. For example, some steps in a method or some modules in an apparatus may be integrated into one step or one module. In the steps or modules in which no necessary causal relationship logically exists, the execution order of the steps of a method or the connection among the modules of the apparatus is not limited to the execution orders or the connection shown in the embodiments or the accompany drawings of the specification. When the steps or modules are applied to an apparatus, a server, or a terminal product, sequential execution or parallel execution may be performed according to the steps or modules shown in the embodiments or the accompany drawings (for example, in a parallel processing or multi-thread processing environment, and even in environments including distributed processing and server clustering).

For clarity, the following embodiments are described by taking an embodiment scenario as an example, in which a photographer performs video recording by using a mobile terminal, and a server processes captured video data to obtain one or more loss assessment images. The photographer may be an insurance company operator, and the photographer holds a mobile terminal to perform video recording of a damaged vehicle. The mobile terminal may be a mobile phone, a tablet computer, or any of other general-purpose or dedicated devices having a video recording function and a data communication function. A corresponding application module (for example, a vehicle loss assessment application (APP) installed on the mobile terminal) may be deployed on the mobile terminal and the server, to implement corresponding data processing. However, a person skilled in the art can understand that the essential spirit of the solutions can be applied to other embodiment scenarios for obtaining vehicle loss assessment images. For example, the photographer may be a vehicle owner, or after filming performed by using the mobile terminal, video data is processed and a loss assessment image is obtained on the mobile terminal.

As shown in FIG. 1, the method for obtaining a vehicle loss assessment image according to some embodiments of the specification, may include the following steps S1-S4.

S1: A client obtains captured video data, and sends the captured video data to a server.

The client may include a general-purpose or dedicated device having a video recording function and a data communication function, for example, a terminal device such as a mobile phone or a tablet computer. In other examples, the client may further include a computer device (such as a PC terminal) having a data communication function and a portable video recording device connected to the computer device. A combination of the computer device and the portable video recording device is considered as a terminal device of the client in some embodiments. A photographer obtains the captured video data by using the client, and the captured video data may be transmitted to the server. The server may include a processing device that analyzes and processes frames of images in the video data and determines loss assessment images. The server may include a logical unit apparatus having an image data processing and data communication function. From a perspective of data exchange, the server is a second terminal device that performs data communication with the client used as the first terminal device. Therefore, for ease of description, a terminal on which the captured video data is obtained through video recording of a vehicle is referred to as the client, and a terminal on which the loss assessment images are generated through processing on the captured video data is referred to as the server. In the specification, it is not excluded that in some embodiments, the client and the server are a same terminal device in which the client and the server are physically connected.

In some embodiments of the specification, the video data obtained through filming by using the client may be transmitted to the server in real time, thereby facilitating rapid processing performed by the server. In other embodiments, the video data may alternatively be transmitted to the server after the video recording performed by using the client is completed. If no network connection exists in the mobile terminal when being used by the photographer, the video recording may be performed first, and the video data may be transmitted after the mobile terminal is connected to mobile cellular, a wireless local area network (WLAN), or a dedicated network. Certainly, even if the client can perform normal data communication with the server, the client may alternatively asynchronously transmit the captured video data to the server.

In some embodiments, the captured video data obtained by the photographer by filming a damaged portion of the vehicle may include a video segment, or multiple video segments, for example, multiple segments of captured video data generated through multiple times of filming performed on a same damaged portion at different angles and in different distances, or captured video data of different damaged portions respectively obtained through filming of the damaged portions. Certainly, in some embodiments, complete filming may alternatively be performed on the damaged portions of the damaged vehicle to obtain one video segment lasting a relatively long time.

S2: The server detects video images in the captured video data to identify a damaged portion in the video images.

In some embodiments, the server may perform image detection on a video image in the captured video data, and identify and process the damaged portion of the vehicle in the video image. Generally, the identified damaged portion occupies a region in the video image and has corresponding region information, for example, a location and a size of the region in which the damaged portion is located.

In some embodiments of detecting the damaged portion in the video image, the damaged portion in the video image may be identified by using a constructed damage detection model. The damage detection model detects the damaged portion of the vehicle and the region of the damaged portion in the image by using a deep neural network. In an embodiment of this application, the damage detection model may be constructed based on a convolutional neural network (CNN) and a region proposal network (RPN) and in combination with a pooling layer, a fully-connected (FC) layer, and the like.

Figure 2:
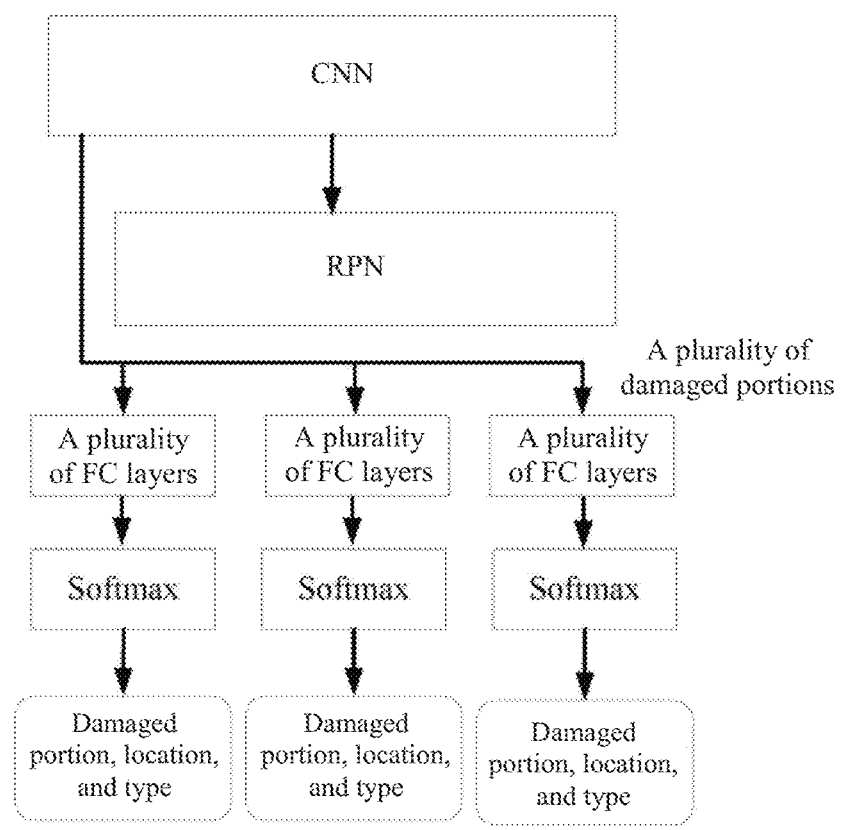
FIG. 2 is a schematic structural diagram of a model for identifying a damaged portion in a video image that is constructed by using the method according to some embodiments of the specification.
Figure 3:
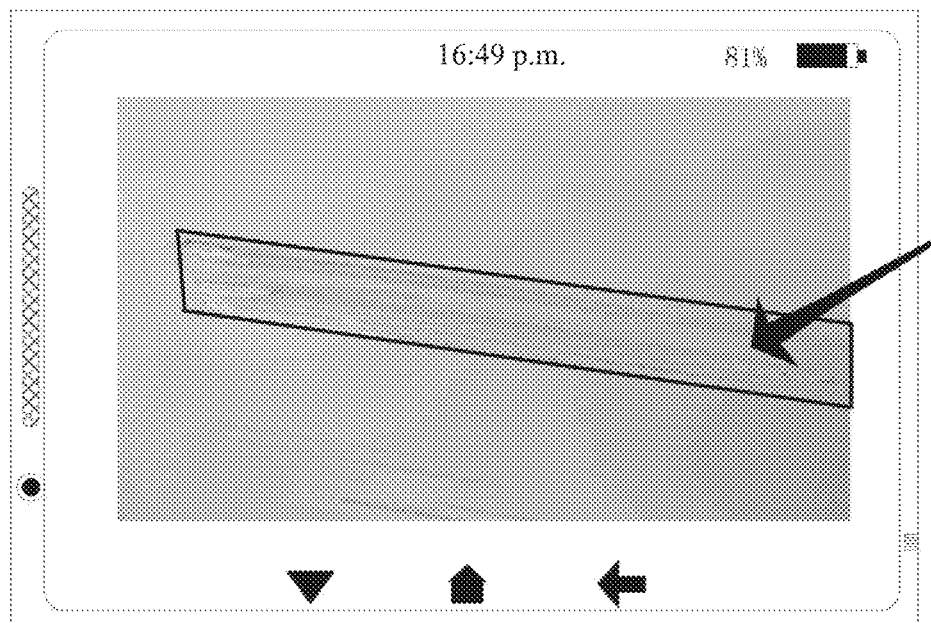
FIG. 3 is a schematic diagram of identifying a damaged portion by using a damage detection model in the method according to some embodiments of the specification.

In some embodiments, the damage detection model used for identifying a damaged portion included in a video image may be pre-constructed by using a designed machine learning algorithm. After the damage detection model is trained based on samples, the damage detection model can identify one or more damaged portions in the video image. The damage detection model may be constructed by using a network model of the deep neural network or a varied network model of the deep neural network trained based on samples. In some embodiments, the construction may be based on the CNN and the RPN, in combination with the FC layer, the pooling layer, a data normalization layer, and the like. Certainly, in other embodiments, if the damaged portion is to be classified, a probability output layer (Softmax) and the like may further be added to the damage detection model. An example is shown in FIG. 2. FIG. 2 is a schematic structural diagram of a model for identifying a damaged portion in a video image that is constructed by using the method according to some embodiments of the specification. FIG. 3 is a schematic diagram of identifying a damaged portion by using a damage detection model in the method according to some embodiments of the specification. The identified damaged portion may be displayed on the client in real time.

The CNN is generally a neural network using a convolutional layer as a main structure and including others such as an activation layer, and is mainly used for image identification. In some embodiments, the deep neural network may be generated by using the convolutional layer and other important layers (such as sample damage images input to the model for training, the data normalization layer, and the activation layer), in combination with the RPN. In the CNN, a two-dimensional discrete convolution operation in image processing is generally combined with an artificial neural network. This convolution operation may be used for automatic feature extraction. The RPN may use a feature extracted from an image (arbitrary size) as input (which may be a two-dimensional feature extracted by using the CNN), and output a set of rectangular target proposal boxes. Each of the boxes has an object score.

In the foregoing embodiments, one or more damaged portions in the video image may be identified during model training. For example, during training based on samples, a picture is input, and multiple regions of the picture may be output. If there is one damaged portion, a region of the picture may be output; if there are k damaged portions, k regions of the picture may be output; or if there is no damaged portion, zero image region is output. Selected parameters of the neural network may be obtained through mini-batch gradient descent training by using marked data. For example, when a mini-batch equals 32, 32 training pictures are used as one input for training.

In other embodiments, the damage detection model may be multiple models and their variations based on the CNN and the RPN, such as Faster R-CNN, YOLO, and Mask-FCN. The CNN may use any CNN model, such as ResNet, Inception, VGG, or a variation thereof. Generally, the CNN part of the neural network may use a mature network structure, for example, a network such as Inception or ResNet, that achieves a relatively good effect in object recognition. For example, in a ResNet network, input is a picture, and output is multiple damaged regions and confidence (where the confidence herein is a parameter indicating an authenticity degree of an identified damaged region) corresponding to the damaged regions. Fast R-CNN, YOLO, Mask-FCN, and the like are all deep neural networks that include convolutional layers and that can be used in this embodiment. The deep neural network used in the embodiments, in combination with a region proposal layer and the CNN layer, can detect the damaged portion in the video image and confirm the region of the damaged portion in the video image. In some embodiments, the CNN part may use a mature network structure that achieves a good effect in object recognition. In a ResNet network, parameters of the model may be obtained through mini-batch gradient descent training by using marked data.

When the photographer performs video recording by using the client, a location region of the damaged portion identified by the server may be displayed on the client in real time, so that a user can observe and confirm the damaged portion. After identifying the damaged portion, the server may track the damaged portion. In addition, in a tracking process, as a filming distance and an angle change, a size and a location of the location region corresponding to the damaged portion in the video image may also correspondingly change.

In other embodiments, the photographer may interactively change the location and the size of the identified damaged portion in the video image. For example, the client displays, in real time, the location region of the damaged portion detected by the server. If the photographer considers performing adjustment because the location region of the damaged portion identified by the server cannot completely cover the damaged portion observed on the scene, the photographer may adjust the location and the size of the location region of the damaged portion on the client. For example, the location of the damaged portion is adjusted by moving the location region after the location region is selected by long pressing the damaged portion, or the size of the damaged portion is adjusted by stretching a frame of the location region of the damaged portion. After the photographer adjusts and changes the location region of the damaged portion on the client, new information of the damaged portion may be generated, and then the new information of the new damaged portion is sent to the server.

In this way, the photographer may conveniently and flexibly adjust the location region of the damaged portion in the video image according to a status of the damaged portion on the scene, to more accurately locate the damaged portion, so that the server can obtain high-quality loss assessment images more accurately and reliably.

The server receives the captured video data uploaded by the client, detects the video images in the captured video data to identify the damaged portion in the video images.

S3: The server classifies the video images based on the detected damaged portion to determine candidate image classification sets of the damaged portion.

Vehicle loss assessment often requires different types of image data, for example, images of the entire vehicle at different angles, an image that can display a damaged component, and a close-up detailed image of a damaged portion. In the specification, during obtaining the loss assessment images, the video images may be analyzed to determine, for example, whether a video image is an image of the damaged vehicle, whether a vehicle component is included in the analyzed image, whether one or more vehicle components are included, or whether the vehicle component is damaged. In some embodiments, loss assessment images required for vehicle loss assessment may be correspondingly classified into different types, and other images that do not satisfy loss assessment image requirements may be respectively classified into another type. In some embodiments, each frame of image of the captured video may be extracted, identified, and classified to form the candidate image classification sets of the damaged portion.

In some embodiments, the determined candidate image classification sets may include: S301: A close-up image set including images displaying the damaged portion and a component image set including images displaying a vehicle component to which the damaged portion belongs.

The close-up image set includes one or more close-up images of the damaged portion. The component image set includes one or more images displaying a damaged component of the damaged vehicle, and the damaged component has at least one damaged portion. In some embodiments, the photographer may film the damaged portion of the damaged vehicle from near to far (or from far to near) through movement or zooming in/out. The server may identify and process the frame of image (each frame of image may be processed, or frames of image of a video segment may be selected and processed) in the captured video, to determine classification of video images. In some embodiments, the video images of the captured video may be classified into the following three types, for example:
- a: close-up image: a close-up image of the damaged portion that can clearly display detailed information of the damaged portion;
- b: component image, including the damaged portion and that can display a vehicle component at which the damaged portion is located; and
- c: image that does not belong to the "a" type or the "b" type.

In some embodiments, an identification algorithm or classification requirements and the like of the a-type image may be determined according to requirements of close-up images of the damaged portion. During identification of the a-type images, in some embodiments, an a-type image may be identified based on a size (an area or a region span) of a region occupied by the damaged portion in the current video image. If the damaged portion occupies a relatively large region in the video image (for example, a size of the region is greater than a threshold, for example, a length or a width of the region is greater than one quarter of that of the video image), the video image may be determined as an a-type image. In other embodiments, if in analyzed frames of image of a same damaged component, an area of a region of the damaged portion in a current frame of image is greater than that in other analyzed frames of image that includes the damaged portion, the current frame of image may be determined as the a-type image. For example, if a ratio of the area of the region of the damaged portion to the area of the current frame of image is larger than a preset ratio, or among the top ratios, the current frame of image may be determined as the a-type image.

Therefore, in some embodiments, a video image may be classified into the close-up image set when at least one of the following conditions are satisfied:

S3011: a ratio of an area of the damaged portion to that of a video image including the damaged portion is greater than a first preset ratio.

S3012: a ratio of a horizontal coordinate span of the damaged portion to a length of a video image including the damaged portion is greater than a second preset ratio, and/or a ratio of a longitudinal coordinate span of the damaged portion to a height of the video image including the damaged portion is greater than a third preset ratio.

S3013: the video image is one of the first K video images or is a video image in which a ratio of an area of the corresponding damaged portion to that of the video image is greater a fourth preset ratio, from the video images of the same damaged portion, after the video images are sorted in descending order of areas of the damaged portion, where $K \geq 1$.

In the a-type damage detailed image, the damaged portion generally occupies a relatively large region range. Selection of a damaged portion detailed image can be well controlled by setting the first preset ratio in S3011 to obtain an a-type image that satisfies the processing requirements. The area of the region of the damaged portion in the a-type image may be obtained through counting pixel points included in region of the damaged portion.

Figure 4:
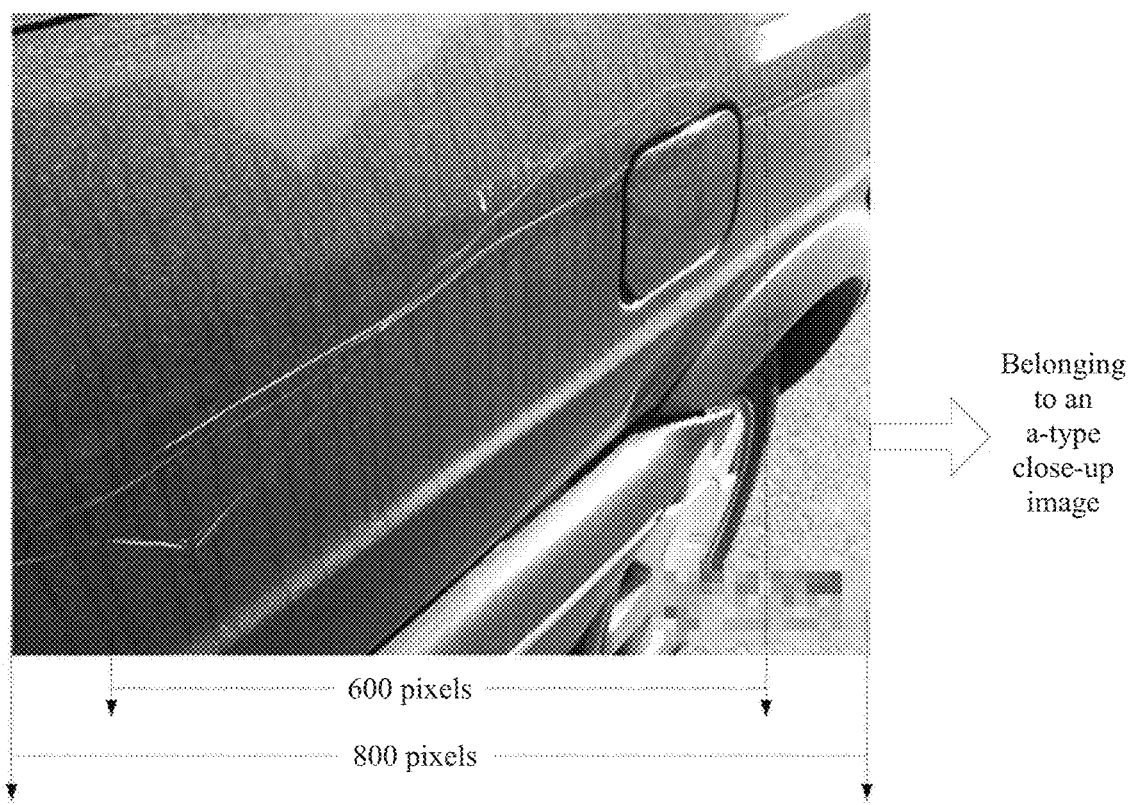
FIG. 4 is a schematic diagram of determining, based on an identified damaged portion, a close-up image according to some embodiments of the specification.

In other embodiments, S3012, whether the video image is an a-type image is alternatively determined according to a coordinate span of the damaged portion relative to the video image. For example, FIG. 4 is a schematic diagram of determining, based on an identified damaged portion, a close-up image according to some embodiments of the specification. As shown in FIG. 4, the video image has 800*650 pixels, and the damaged vehicle has two relatively long scratches, a horizontal coordinate span corresponding to each of which is a length of 600 pixels, while the vertical coordinate span corresponding to each of which is very narrow. Thus, although an area of the region of the damaged portion is less than one tenth of that of the video image to which the damaged portion belongs, the 600-pixel horizontal coordinate span of the damaged portion occupies three quarters of the 800-pixel length of the entire video image. Therefore, according to the condition in S3012, the video image may be marked as an a-type image.

In other embodiments, S3013, the area of the damaged portion may be the area of the region of the damaged portion in S3011, or may be a span value of a length or a height of the damaged portion.

Certainly, the a-type image may alternatively be identified by combining the foregoing various conditions. For example, the area of the region of the damaged portion occupies the video image at a ratio and the ratio of area is greater than the fourth preset ratio or the region area of the damage is the maximum in the images of the same damaged region. In some embodiments, the a-type images generally include all or some detailed image information of the damaged portion.

The first preset ratio, the second preset ratio, the third preset ratio, and the fourth preset ratio that are described above may be correspondingly set according to image identification precision, classification precision, other processing requirements, or the like. For example, a value of the second preset ratio or the third preset ratio may be one quarter.

In some embodiments, in identification of the b-type images, vehicle components (such as a front bumper, a left front fender, and a right rear door) included in the video images and their locations may be detected by using a constructed vehicle component detection model. If the damaged portion is located on the detected damaged components, the video images may be determined as the b-type images. For example, in a video image P1, if a component region of the detected damaged component in the P1 includes the identified damaged portion (generally, the area of the identified component region is greater than the area of the damaged portion), the component region in the P1 can be deemed as the damaged component. Alternatively, in a video image P2, if a damaged region detected in the P2 and the component region detected in the P2 overlap, a vehicle component corresponding to the component region in the P2 can also be deemed as the damaged component, and the video image is classified as a b-type image.

Figure 5:
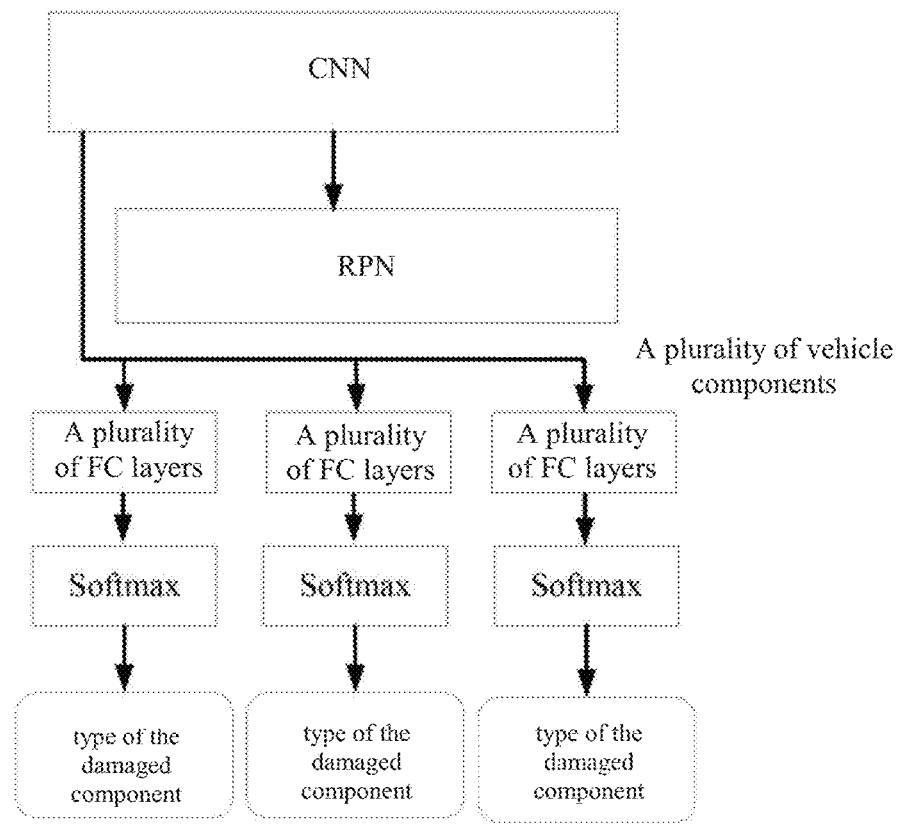
FIG. 5 is a schematic structural diagram of a model for identifying a damaged component in a video image that is constructed by using the method according to some embodiments of the specification.

In some embodiments, the component detection model detects, by using the deep neural network, the component and a region of the component in the image. In some embodiments, the component damage identification model may be constructed based on a CNN and an RPN and in combination with a pooling layer, an FC layer, and the like. For example, in regard to the component recognition model, multiple models and variations thereof, such as Faster R-CNN, YOLO, and Mask-FCN, based on the CNN and the RPN, may be used. The CNN may use any CNN model, such as ResNet, Inception, VGG, or a variation thereof. Generally, a CNN part of the neural network may use a mature network structure, for example, a network such as Inception or ResNet, that achieves a relatively good effect in object recognition. For example, in a ResNet network, input is a picture, and output is multiple component regions, corresponding component classification, and confidence (where the confidence herein is a parameter indicating an authenticity degree of an recognized vehicle component). Fast R-CNN, YOLO, Mask-FCN, and the like are all deep neural networks that include convolutional layers and that can be used in the embodiments. The deep neural network used in the embodiments, in combination with a region proposal layer and the CNN layer, can detect a vehicle component in a to-be-processed image, and confirm a component region of the vehicle component in the to-be-processed image. In some embodiments, the CNN part may use a mature network structure that achieves a good effect in object recognition. In a ResNet network, parameters of the model may be obtained through mini-batch gradient descent training by using marked data. FIG. 5 is a schematic structural diagram of a model for identifying a damaged component in a video image that is constructed by using the method according to some embodiments of the specification.

In some embodiments, if a video image satisfies both of the determining conditions of the a-type images and the b-type images, the video image may be classified as both an a-type image and a b-type image.

The server may extract the video images from the captured video data, classifies the video images based on the detected damaged portion, and determines the candidate image classification sets of the damaged portion.

S4: The server selects a vehicle loss assessment image from the candidate image classification sets according to a preset screening condition.

An image satisfying the preset screening condition may be selected from the candidate image classification sets according to a loss assessment image type, clarity, and the like. The preset screening condition may be customized. For example, multiple (for example, five or ten) images having the highest clarity and having different filming angles may be respectively selected from the a-type images and the b-type images as loss assessment images of the identified damaged portion. The image clarity may be calculated based on the damaged portion and the image region in which the detected vehicle component is located, and may be obtained, for example, by using a method such as a spatial domain-based operator (such as a Gabor operator) or a frequency domain-based operator (such as fast Fourier transformation). For the a-type images, generally, all regions in the damaged portion may be displayed by a combination of one or more images, thereby ensuring that comprehensive damaged region information can be obtained.

The methods for obtaining a vehicle loss assessment image provides a solution of generating a video-based vehicle loss assessment image. A photographer may perform video recording of a damaged vehicle by using the terminal device, and captured video data may be transmitted to a server of a system. The server analyzes the video data, identifies a damaged portion, and obtains different types of candidate images required for loss assessment according to the damaged portion. Then, one or more loss assessment images of the damaged vehicle may be generated from the candidate images. According to the embodiments of the specification, high-quality loss assessment images satisfying loss assessment processing requirements can be quickly obtained, thereby improving efficiency of obtaining loss assessment images, and also reducing costs of obtaining and processing loss assessment images by insurance company operators.

In some embodiments of the methods in the specification, a video captured on the client is transmitted to the server, and the server may track a location of a damaged portion in the video in real time according to the damaged portion. For example, in the foregoing embodiments, because the damaged vehicle is a static object, the mobile terminal is moved as the photographer moves. Thus, a correspondence between neighboring frames of image in the captured video may be obtained by using such image algorithms as an optical flow-based algorithm, to implement tracking of the damaged portion. If the mobile terminal has sensors such as an accelerometer and a gyroscope, a motion direction and an angle of the photographer may further be determined by combining signal data of these sensors, thereby more precisely tracking the damaged portion. Therefore, in some embodiments, the method for obtaining a vehicle loss assessment image may further include:

S200: The server tracks the damaged portion in the captured video data in real time to determine a region of the damaged portion in the video images; and when determining that the damaged portion is out of a video image and then re-enters a video image, the server tracks the damaged portion again to determine a region of the damaged portion based on image feature data of the damaged portion.

The server may extract image feature data of the damaged region, for example, scale-invariant feature transform (SIFT) feature data. If the damaged portion re-enters the video image after the damaged portion is out of the video image, the system can locate the damaged portion and continue to track the damaged portion. For example, after a photographing device is restarted after being powered off, or the filmed region is moved to areas where no damage occurs, the same damaged portion is filmed again.

The location region of the damaged portion identified by the server may be displayed on the client in real time, to help a user to observe and confirm the damaged portion. The client and the server may simultaneously display the identified damaged portion. The server may track the identified damaged portion. In addition, as a filming distance and an angle change, a size and a location of the location region corresponding to the damaged portion in the video image may also correspondingly change. In this way, the server may display, in real time, the damaged portion tracked by the client, to facilitate observation and use of an operator of the server.

In other embodiments, during real-time tracking performed by the server, the server may send the region of the tracked damaged portion to the client, so that the client may display the damaged portion synchronously with the server in real time, to help the photographer to observe the damaged portion located and tracked by the server. Therefore, the method for obtaining a vehicle loss assessment image may further include:

S210: The server sends the region of the tracked damaged portion to the client, for the client to display the region of the damaged portion in real time.

In some embodiments, the photographer may interactively change the location and the size of the damaged portion in the video images. For example, when the client displays the identified damaged portion, if the photographer considers performing adjustment because the region of the identified damaged portion cannot completely cover the damaged portion, the photographer may adjust the location and the size of the region on the client. For example, the location of the damaged portion is adjusted by moving the region after the region is selected by long pressing the damaged portion, or the size of the damaged portion is adjusted by stretching a frame of the region of the damaged portion. After the photographer adjusts and changes the region of the damaged portion on the client, new information of the damaged portion may be generated, and then the new information of the damaged portion is sent to the server. In addition, the server may synchronously update the information of the damaged portion based on the changed information on the client. The server may identify and process subsequent video images according to the updated information of the damaged portion. Alternatively, a new damaged portion may be indicated by the photographer on the client, and the client receives the information of the new damaged portion and sends the information to the server for processing. In some embodiments, the method for obtaining a vehicle loss assessment image may further include:

S220: The server receives new information of the damaged portion sent by the client, where the new information of the damaged portion is determined when the client changes the region of the damaged portion based on a received interactive instruction; and correspondingly, classifies the video images based on the new information of the damaged portion.

In this way, the photographer may conveniently and flexibly adjust the region of the damaged portion in the video images according to a status of the damaged portion on the scene, to more accurately locate the damaged portion, so that the server obtains high-quality loss assessment images.

In some embodiments, when filming a close-up of the damaged portion, the photographer may continuously film the damaged portion from different angles. The server may calculate a filming angle of each frame of image according to the tracking of the damaged portion, to select a group of video images at different angles as loss assessment images of the damaged portion, so that the loss assessment images can accurately reflect a type and degree of the damage. Therefore, selecting a vehicle loss assessment image from the candidate image classification sets according to a preset screening condition in the above step S4 may include:

S401: Selecting at least one video image as a loss assessment image of the damaged portion from the candidate image classification sets of the damaged portion respectively according to clarity of the video images and filming angles of the damaged portion in the video images.

For example, in some accident scenes, component deformation may be obvious at some angles relative to other angles, or if a damaged component has glare or reflection, the glare or reflection changes with a change of the filming angle, and the like. In this embodiments of the specification, images at different angles are selected as loss assessment images, thereby greatly reducing interference of these factors on loss assessment. In some embodiments, if the client has sensors such as an accelerometer and a gyroscope, the filming angle may alternatively be obtained by using signals of the sensors or obtained with assistance of calculation.

In some embodiments, multiple candidate image classification sets may be generated. When a loss assessment image is selected, one or more types, such as the foregoing "a" type, "b" type, and "c" type, of the candidate image classification sets may be applied. For example, the loss assessment image may be selected from an a-type candidate image classification set and a b-type candidate image classification set. In a-type images and b-type images, multiple images (for example, five images of a same component are selected, and ten images of a same damaged portion are selected) having the highest clarity and different filming angles are respectively selected as loss assessment images. The image clarity may be calculated based on the damaged portion and the image region in which the detected vehicle component is located, for example, by using a method such as a spatial domain-based operator (such as a Gabor operator) or a frequency domain-based operator (such as fast Fourier transformation). Generally, for the a-type image, any region of the damaged portion appears in at least one of the selected images.

Figure 6:
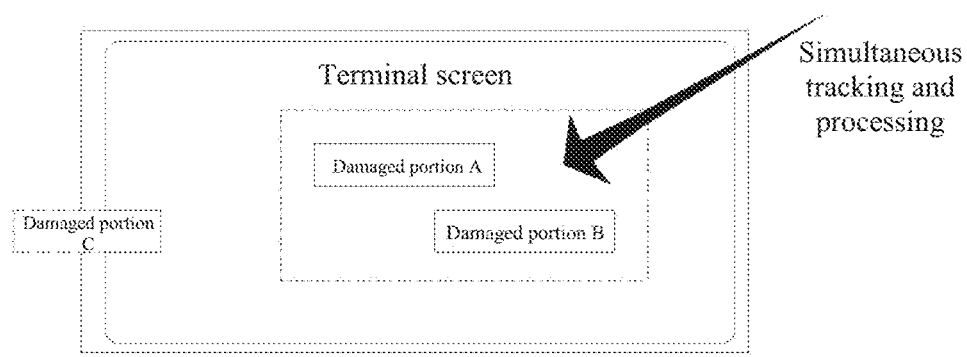
FIG. 6 is a schematic diagram of a processing scenario of a method for obtaining a vehicle loss assessment image according to some embodiments of the specification.

In some embodiments, if detecting that the damaged vehicle has multiple damaged portions, and the damaged portions are close to each other, the server may simultaneously track the multiple damaged portions, and analyze and process each damaged portion, to obtain a corresponding loss assessment image. The server performs the foregoing processing on all the identified damaged portions, to obtain one or more loss assessment images of each damaged portion, and then all the generated loss assessment images may be used as loss assessment images of the entire damaged vehicle. FIG. 6 is a schematic diagram of a processing scenario of a method for obtaining a vehicle loss assessment image according to some embodiments of the specification. As shown in FIG. 6, a distance between a damaged portion A and a damaged portion B is relatively short, so that the damaged portion A and the damaged portion B may be simultaneously tracked. However, a damaged portion C is located on the other side of a damaged vehicle and is far away from the damaged portion A and the damaged portion B in a captured video. Therefore, instead of tracking the damaged portion C together with the damaged portion A and the damaged portion B, the damaged portion C may be filmed alone after the damaged portion A and the damaged portion B are filmed.

Accordingly, in some embodiments, in response to detecting that there are at least two damaged portions in the video image, whether a distance between the at least two damaged portions satisfies a set proximity condition is determined; and in response to determining that the distance between the at least two damaged portions satisfies the set proximity condition, the at least two damaged portions are simultaneously tracked, and corresponding loss assessment images are respectively generated.

The proximity condition may be set according to the quantity of damaged portions, sizes of the damaged portions, distances among the damaged portions, and the like in a same video image.

If detecting that at least one of the close-up image set and the component image set of the damaged portion is empty, or the video images in the close-up image set do not cover the entire damaged portion, the server may generate a video recording prompt message, and then send the video recording prompt message to the client corresponding to the captured video data.

In the foregoing example, if the server cannot obtain a b-type loss assessment image that can be used to determine a vehicle component in which the damaged portion is located, the server may return a video recording prompt message to the client of the photographer, to prompt the photographer to film multiple neighboring vehicle components including the damaged portion, so as to obtain one or more b-type loss assessment images. If the server cannot obtain an a-type loss assessment image, or all a-type images, alone or in combination, cannot cover the entire region of the damaged portion, the server may return a video recording prompt message to the photographer, to prompt the photographer to film a close-up of the damaged portion to cover the entire region of the damaged portion.

In other embodiments, if the server detects that clarity of a captured video image is insufficient (where the clarity is lower than a preset threshold or lower than average clarity of a recent recorded video segment), the server may prompt the photographer to move slowly, thereby ensuring captured images' quality. For example, a video recording prompt message is returned to a mobile terminal APP, to prompt a user to pay attention to such factors of filming as focusing and illumination that affect the clarity. For example, the prompt information "Too fast. Please move slowly to ensure image quality." is displayed.

In some embodiments, the server may maintain a video segment used for generating loss assessment images for subsequent viewing, authentication, and the like. Alternatively, the client may upload or copy loss assessment images in batches to the server after video images are captured.

The method for obtaining a vehicle loss assessment image in the foregoing embodiments provides a solution of generating a video-based vehicle loss assessment image. The photographer may perform video recording of a damaged vehicle by using the terminal device, and captured video data may be transmitted to the server, and the server analyzes the video data, identifies the damaged portion, and obtains, according to the damaged portion, different types of candidate images required for loss assessment, Then, one or more loss assessment images of the damaged vehicle may be generated from the candidate images. According to the embodiments of the specification, high-quality loss assessment images satisfying loss assessment processing requirements can be quickly obtained, thereby improving efficiency of obtaining loss assessment images, and also reducing costs of obtaining and processing loss assessment images by insurance company operators.

Figure 7:
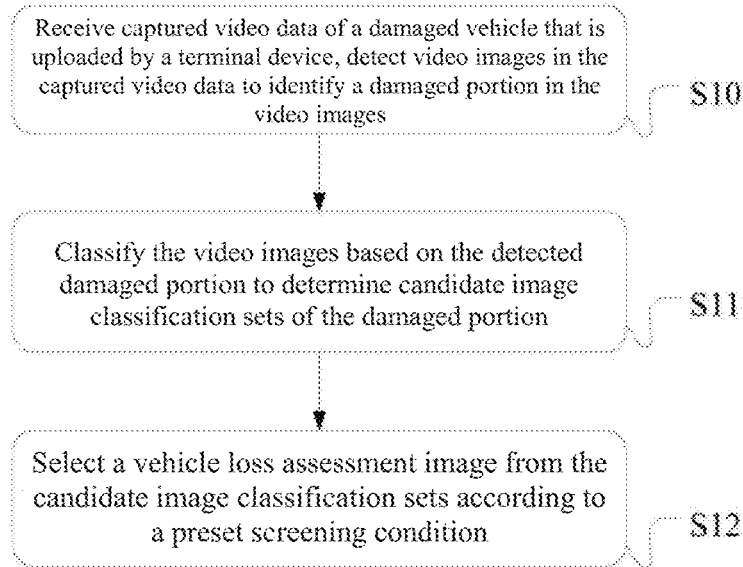
FIG. 7 is a schematic flowchart of the method for obtaining a vehicle loss assessment image according to other embodiments of the specification.

In the foregoing embodiments of obtaining the loss assessment images by using the recorded video data of the damaged vehicle are described in examples where the client interacts with the server. Based on the foregoing descriptions, the specification provides a method for obtaining a vehicle loss assessment image that can be applicable to a server. FIG. 7 is a schematic flowchart of the method for obtaining a vehicle loss assessment image according to other embodiments of the specification. As shown in FIG. 7, the method may include:

S10: Receiving captured video data of a damaged vehicle that is uploaded by a terminal device, detect video images in the captured video data to identify a damaged portion in the video images.

S11: Classifying the video images based on the detected damaged portion to determine candidate image classification sets of the damaged portion.

S12: Selecting a vehicle loss assessment image from the candidate image classification sets according to a preset screening condition.

The terminal device may be the client described in the foregoing embodiments, and may be other terminal devices, for example, a database system, a third-party server, or a flash memory. In some embodiments, after receiving the video data obtained through filming of the damaged vehicle and uploaded or copied by the client, the server may detect the captured video data to identify the damaged portion, and then classify the video images in the video data according to the identified damaged portion. Further, the vehicle loss assessment image is generated through screening. According to the embodiments, high-quality loss assessment images satisfying loss assessment processing requirements can be quickly obtained, thereby improving efficiency of obtaining loss assessment images, and also reducing costs of obtaining and processing loss assessment images by insurance company operators.

Vehicle loss assessment often requires different types of image data, for example, images of the entire vehicle at different angles, images that can display a damaged component, and close-up detailed image of a damaged portion. In some embodiments, required loss assessment images may be correspondingly classified into different types. For example, the determined candidate image classification sets may include: a close-up image set displaying the damaged portion and a component image set displaying a vehicle component to which the damaged portion belongs.

Generally, the video images in the candidate image classification sets, for example, the foregoing a-type close-up images, the b-type component images, and the c-type images that do not belong to the "a" type or the "b" type, include at least one damaged portion.

In some embodiments of the method for obtaining a vehicle loss assessment image, a video image may be classified into the close-up image set when at least one of the following conditions are satisfied: a ratio of an area of the damaged portion to that of a video image including the damaged portion is greater than a first preset ratio; a ratio of a horizontal coordinate span of the damaged portion to a length of a video image including the damaged portion is greater than a second preset ratio, and/or a ratio of a longitudinal coordinate span of the damaged portion to a height of the video image including the damaged portion is greater than a third preset ratio; and the video image is one of the first K video images or is a video image in which a ratio of an area of the corresponding damaged portion to that of the video image is greater a fourth preset ratio, from the video images of the same damaged portion, after the video images are sorted in descending order of areas of the damaged portion, where K≥1.

In some embodiments, an identification algorithm or classification requirement and the like of the a-type image may be determined according to requirements of a damaged portion close-up image for loss assessment processing. During identification of the a-type image, in some embodiments, an a-type image may be identified based on a size (an area or a region span) of a region occupied by the damaged portion in the current video image. If the damaged portion occupies a relatively large region in the video image (for example, a size of the region is greater than a threshold, for example, a length or a width of the region is greater than one quarter of that of the video image), the video image may be determined as an a-type image. In other embodiments, if in analyzed frames of image of a same damaged component, an area of a region of the damaged portion in a current frame of image is greater than that in other analyzed frames of image that includes the damaged portion, the current frame of image may be determined as the a-type image. For example, if a ratio of the area of the region of the damaged portion to the area of the current frame of image is larger than a preset ratio, or among the top ratios, the current frame of image may be determined as the a-type image.

In other embodiments of the method for obtaining a vehicle loss assessment image, the method may further include: if it is detected that at least one of the close-up image set and the component image set of the damaged portion is empty, or the video images in the close-up image set do not cover the entire damaged portion, generating a video recording prompt message; and sending the video recording prompt message to the terminal device. The terminal device may be the foregoing client, for example, a mobile phone, that interacts with the server.

In other embodiments of the method for obtaining a vehicle loss assessment image, the method may further include: tracking the damaged portion in the captured video data in real time to determine a region of the damaged portion in the video images; and when determining that the damaged portion is out of a video image and then re-enters a video image, tracking the damaged portion again to determine a region of the damaged portion based on image feature data of the damaged portion. In some embodiments, the region of the damaged portion that is located and tracked again may be displayed on the server.

In other embodiments of the method for obtaining a vehicle loss assessment image, the method may further include: sending information of the region of the tracked damaged portion to the terminal device for the terminal device to display the region of the damaged portion in real time.

A photographer may display the identified damaged portion on the client in real time, to help a user to observe and confirm the damaged portion. In this way, the photographer may conveniently and flexibly adjust the location region of the damaged portion in the video image according to a status of the damaged portion on the scene, to more accurately locate the damaged portion, so that the server obtains high-quality loss assessment images.

In another implementation, the photographer may interactively change the location and the size of the damaged portion in the video images. After the photographer adjusts and changes the location region of the identified damaged portion on the client, new information of the damaged portion may be generated, and then the new information of the damaged portion is sent to the server. In addition, the server may synchronously update the new damaged portion changed on the client. The server may identify and process a subsequent video image according to the new damaged portion. Therefore, in some embodiments of the method for obtaining a vehicle loss assessment image, the method may further include: receiving new information of the damaged portion sent by the client, where the new information of the damaged portion is determined when the client changes the region of the damaged portion based on a received interactive instruction; and correspondingly, classifying the video images based on the new information of the damaged portion.

In this way, the photographer may conveniently and flexibly adjust the region of the damaged portion in the video image according to a status of the damaged portion on the scene, to more accurately locate the damaged portion, so that the server obtains high-quality loss assessment images.

When filming a close-up of the damaged portion, the photographer may continuously film the damaged portion from different angles. The server may calculate a filming angle of each frame of image according to the tracking of the damaged portion, to select a group of video images at different angles as loss assessment images of the damaged portion, so that the loss assessment images can accurately reflect a type and degree of the damage.

Therefore, selecting a vehicle loss assessment image from the candidate image classification sets according to a preset screening condition may include: selecting at least one video image as a loss assessment image of the damaged portion from the candidate image classification sets of the damaged portion respectively according to clarity of the video images and filming angles of the damaged portion in the video images.

If identifying that the damaged vehicle has multiple damaged portions, and the damaged portions are close to each other, the server may simultaneously track the multiple damaged portions, to generate loss assessment images of each damaged portion. The server performs the foregoing processing on all the damaged portions specified by the photographer, to obtain the loss assessment image of each damaged portion, and then all the generated loss assessment images may be used as loss assessment images of the entire damaged vehicle. Therefore, in some embodiments of the method for obtaining a vehicle loss assessment image, if it is detected that there are at least two damaged portions in the video image, whether a distance between the at least two damaged portions satisfies a specified proximity condition is determined; and in response to determining that the distance between the at least two damaged portions satisfies the set proximity condition, the at least two damaged portions are simultaneously tracked, and corresponding loss assessment images are respectively generated.

The proximity condition may be set according to a quantity of damaged portions, sizes of the damaged portions, distances between the damaged portions, and the like in a same video image.

Figure 8:
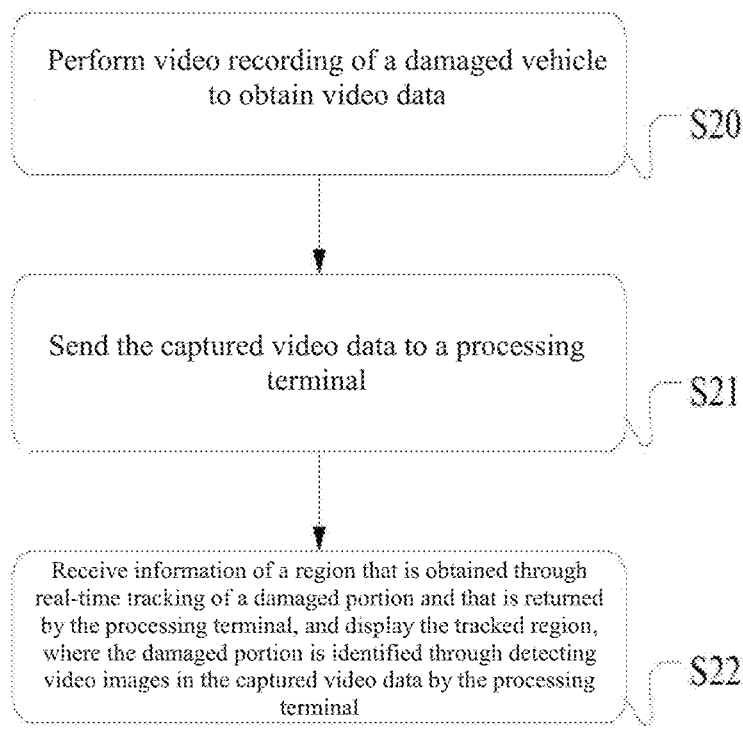
FIG. 8 is a schematic flowchart of the method for obtaining a vehicle loss assessment image according to still other embodiments of the specification.

Based on the embodiments of obtaining the loss assessment image by using the captured video data of the damaged vehicle, described in examples where the client interacts with the server, the specification further provides a method for obtaining a vehicle loss assessment image that can be applicable to a client. FIG. 8 is a schematic flowchart of the method for obtaining a vehicle loss assessment image according to still other embodiments of the specification. As shown in FIG. 8, the method may include:

S20: Performing video recording of a damaged vehicle to obtain video data.

S21: Sending the captured video data to a processing terminal.

S22: Receiving information of a region that is obtained through real-time tracking of a damaged portion and that is returned by the processing terminal, and displaying the tracked region, where the damaged portion is identified through detecting one or more video images in the captured video data by the processing terminal.

The processing terminal includes a terminal device that processes the captured video data and generates loss assessment images of the damaged vehicle based on the identified damaged portion. For example, the processing terminal may be a remote server for performing loss assessment image processing.

In some embodiments, determined candidate image classification sets may include: a close-up image set displaying the damaged portion and a component image set displaying a vehicle component to which the damaged portion belongs, for example, the foregoing a-type image and the b-type image. If the server cannot obtain a b-type loss assessment image that can be used to determine the vehicle component in which the damaged portion is located, the server may return a video recording prompt message to the client of a photographer, to prompt the photographer to film multiple neighboring vehicle components including the damaged portion, so as to obtain one or more b-type loss assessment images. If a system cannot obtain an a-type loss assessment image, or all a-type image, alone or in combination, cannot cover the entire damaged portion, the system may also send a video recording prompt message to the photographer, to prompt the photographer to film a close-up image of the damaged portion to cover the entire damaged portion.

Therefore, in some embodiments, the method may further include: S23: receiving and displaying a video recording prompt message sent by the processing terminal, where the video recording prompt message is generated when the processing terminal detects that at least one of a close-up image set and a component image set of the damaged portion is empty, or when the one or more video images in the close-up image set do not cover the entire damaged portion.

As described above, in other embodiments, the client may display, in real time, the region of the damaged portion that is tracked by the server, and a location and size of the region may be interactively changed on the client. Therefore, in other embodiments of the method, the method may further include: S24: determining new information of a damaged portion after changing the region of the damaged portion based on a received interactive instruction; and send the new information of the damaged portion to the processing terminal, for the processing terminal to classify the video images in the video data based on the new information of the damaged portion.

According to the methods for obtaining a vehicle loss assessment image provided in the foregoing embodiments, a photographer may perform video recording of a damaged vehicle by using the terminal device, and captured video data may be transmitted to the server of a system, and then the server analyzes the video data, identifies a damaged portion, and obtains, according to the damaged portion, different types of candidate images required for loss assessment. Then, a loss assessment image of the damaged vehicle may be generated from the candidate images. According to the embodiments, high-quality loss assessment images satisfying loss assessment processing requirements can be quickly obtained, thereby improving efficiency of obtaining loss assessment images, and also reducing costs of obtaining and processing loss assessment images by insurance company operators.

Figure 9:
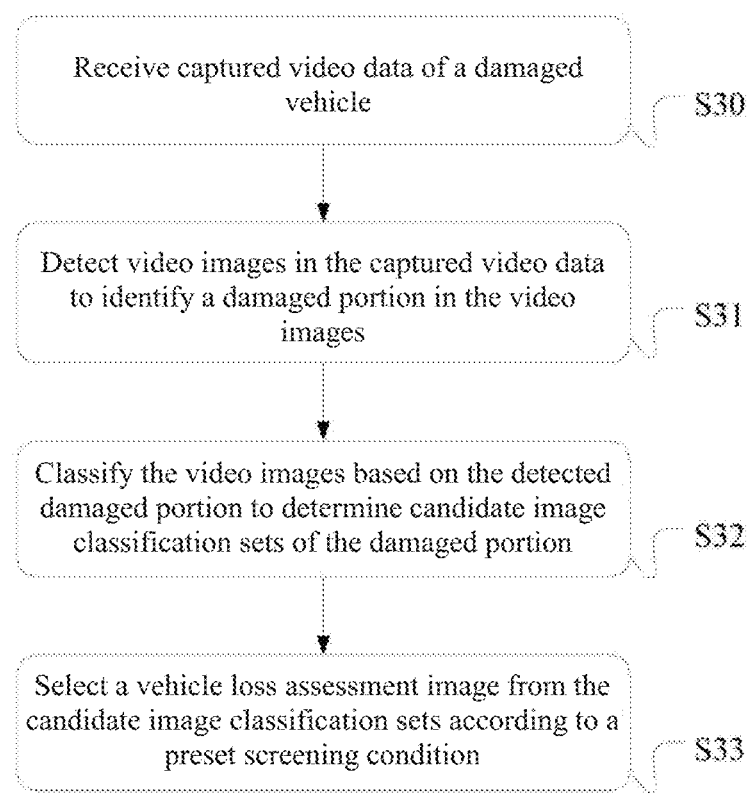
FIG. 9 is a schematic flowchart of the method for obtaining a vehicle loss assessment image according to yet other embodiments of the specification.

In the foregoing embodiments, the methods of obtaining the loss assessment image by using the captured video data of the damaged vehicle are described in examples from a perspective that the client interacts with the server, a perspective of the client, and a perspective of the server, respectively. In other embodiments, when (or after) a vehicle video is filmed on the client, the client may analyze and process the captured video to generate loss assessment images. FIG. 9 is a schematic flowchart of the method for obtaining a vehicle loss assessment image according to yet other embodiments of the specification. As shown in FIG. 9, the method includes:

S30: Receiving captured video data of a damaged vehicle.

S31: Detecting video images in the captured video data to identify a damaged portion in the video images.

S32: Classifying the video images based on the detected damaged portion to determine candidate image classification sets of the damaged portion.

S33: Selecting a vehicle loss assessment image from the candidate image classification sets according to a preset screening condition.

In some embodiments, a terminal device may include application modules deployed in the client. Generally, the terminal device may be a general-purpose or dedicated device having a video recording function and an image processing capability, for example, a client such as a mobile phone or a tablet computer. A photographer may perform video recording of the damaged vehicle by using the client, and the client analyzes the captured video data and identifies the damaged portion, to generate the loss assessment images.

In some embodiments, a server may be further included. The server is configured to receive the loss assessment images generated by the client. The client may transmit the generated loss assessment images to the server in real time or asynchronously. Therefore, in other embodiments of the method, the method may further include: S3301: transmitting the loss assessment images to a server in real time; or S3302: asynchronously transmitting the loss assessment images to a server.

Figure 10:
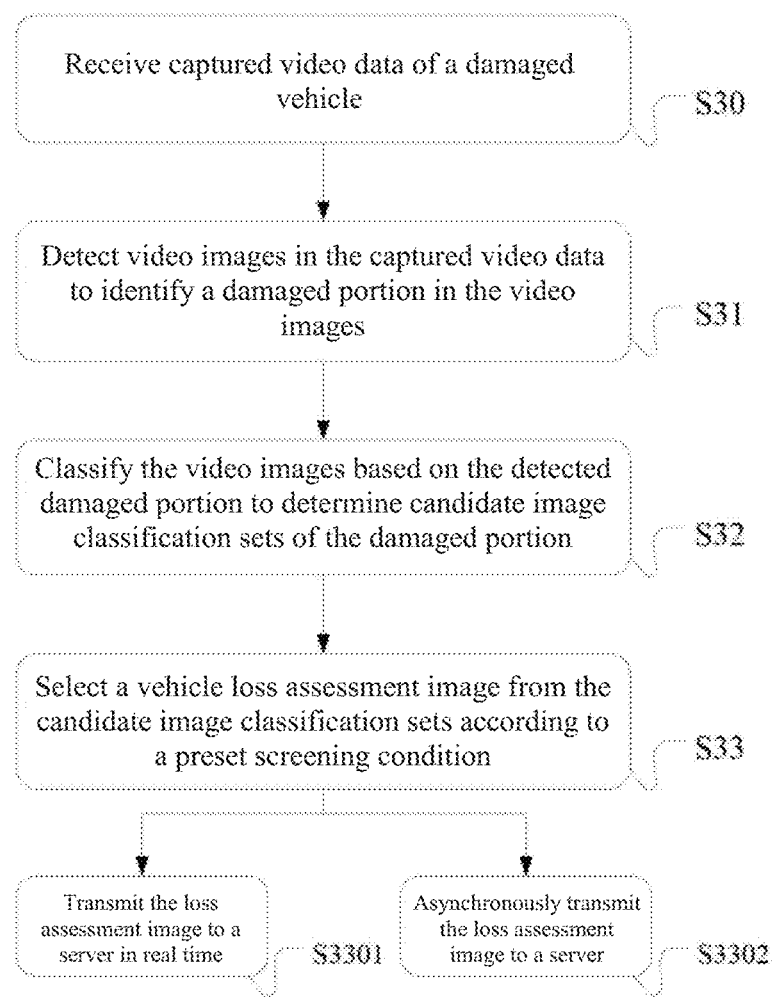
FIG. 10 is a schematic flowchart of the method for obtaining a vehicle loss assessment image according to further other embodiments of the specification.

FIG. 10 is a schematic flowchart of the method for obtaining a vehicle loss assessment image according to further other embodiments of the specification. As shown in FIG. 10, the client may immediately upload the generated loss assessment image to the remote server, or may upload or copy loss assessment images in batches to the remote server afterwards.

Based on the descriptions of the foregoing embodiments where the server generates the loss assessment images, locates and tracks the damaged portion, the method for generating a loss assessment image on the client may further include other embodiments. For example, a video recording prompt message is displayed on a photographing terminal after being generated. Other embodiments describe loss assessment image type classification and identification, classification manners, and damaged portion identifying, positioning, and tracking. Descriptions of related embodiments may be referenced to for details, which are not repeated herein.

According to the methods for obtaining a vehicle loss assessment image provided in the specification, the client may generate a loss assessment image based on a captured video of a damaged vehicle. A photographer may perform video recording of the damaged vehicle by using the client, to capture video data; and then the client analyzes the captured video data and identifies a damaged portion, to obtain candidate images of different types required for loss assessment. Further, the loss assessment images of the damaged vehicle may be generated from the candidate images. According to the embodiments of the specification, video recording can be performed on the client, and high-quality loss assessment images satisfying loss assessment processing requirements can be quickly obtained, thereby improving efficiency of obtaining loss assessment images, and also reducing costs of obtaining and processing loss assessment images by insurance company operators.

Based on the foregoing methods for obtaining a vehicle loss assessment image, the specification further provides an apparatus for obtaining a vehicle loss assessment image. The apparatus may include an apparatus using the system (including a distributed system), software (application), module, component, server, client, and the like in the methods in the specification in combination with necessary hardware. Based on a same innovative concept, an apparatus provided in the specification is described in the following embodiments. Embodiments of the methods and the apparatus are similar. Therefore, for embodiments of the apparatus in the specification, refer to the embodiments of the foregoing methods, and repetitions are not described. The following terms "unit" or "module" may refer to a combination of software and/or hardware having a predetermined function. Although the apparatuses described in the following embodiments are implemented by using software, embodiments of the apparatus implemented by using hardware, or a combination of software and hardware are also possible and conceived.

Figure 11:
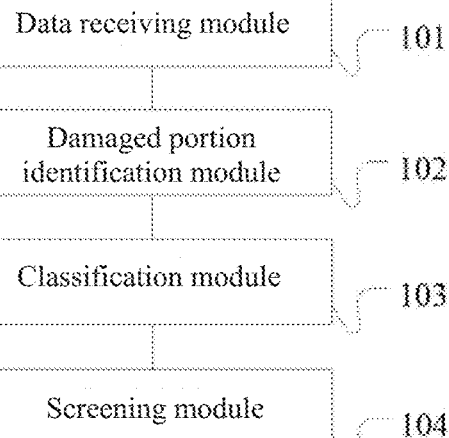
FIG. 11 is a schematic structural diagram of modules of an apparatus for obtaining a vehicle loss assessment image according to some embodiments of the specification.

FIG. 11 is a schematic structural diagram of modules of an apparatus for obtaining a vehicle loss assessment image according to some embodiments of the specification. As shown in FIG. 11, the apparatus may include: a data receiving module 101, configured to receive captured video data of a damaged vehicle that is uploaded by a terminal device; a damaged portion identification module 102, configured to: detect video images in the captured video data to identify a damaged portion in the video images; a classification module 103, configured to: classify the video images based on the detected damaged portion, and determine candidate image classification sets of the damaged portion; and a screening module 104, configured to select a vehicle loss assessment image from the candidate image classification sets according to a preset screening condition.

Figure 12:
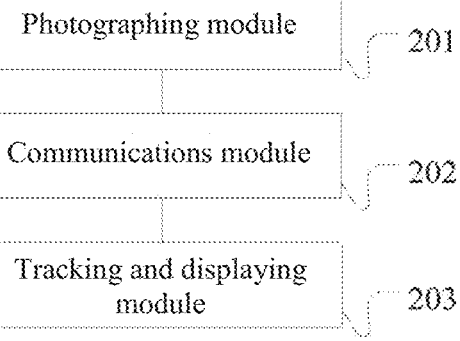
FIG. 12 is a schematic structural diagram of modules of another apparatus for obtaining a vehicle loss assessment image according to some embodiments of the specification.

The foregoing apparatus may be applicable to a server, to implement analyzing and processing of the captured video data uploaded by the client to obtain the loss assessment image. This application further provides an apparatus for obtaining a vehicle loss assessment image that can be applicable to a client. FIG. 12 is a schematic structural diagram of modules of another apparatus for obtaining a vehicle loss assessment image according to some embodiments of the specification. In some embodiments, the apparatus may include: a photographing module 201, configured to: perform video recording of a damaged vehicle to obtain video data; a communications module 202, configured to send the captured video data to a processing terminal; and a tracking and displaying module 203, configured to: receive information of a region of a damaged portion that is obtained through real-time tracking of the damaged portion and that is returned by the processing terminal, and display the region, where the damaged portion is identified through detecting one or more video images in the captured video data by the processing terminal.

In some embodiments, the tracking and displaying module 203 may be a display unit including a display screen. A photographer may indicate the damaged portion in the display screen, and may also display the tracked location region of the damaged portion on the display screen.

The method for obtaining a vehicle loss assessment image provided in the specification may be implemented by a processor's executing corresponding program instructions in a computer. An apparatus for obtaining a vehicle loss assessment image apparatus provided in the specification may include a processor and a memory configured to store instructions executable by the processor, and the processor executes the instructions to implement: receiving captured video data of a damaged vehicle; detecting video images in the captured video data to identify a damaged portion in the video image; classifying the video images based on the detected damaged portion to determine candidate image classification sets of the damaged portion; and selecting a vehicle loss assessment image from the candidate image classification sets according to a preset screening condition.

The apparatus may be a server. The server receives the captured video data uploaded by a client, and then perform analysis and processing, including damaged portion identification, type classification, image selection, and the like, to obtain the vehicle loss assessment images. In some embodiments, the apparatus may alternatively be a client. After performing video recording of the damaged vehicle, the client performs analysis and processing to obtain the vehicle loss assessment images. Therefore, in some embodiments of the apparatus in the specification, the captured video data of the damaged vehicle may be uploaded by a terminal device; or obtained, through video recording of the damaged vehicle, by the apparatus for obtaining a vehicle loss assessment image.

Further, in the embodiments where the apparatus obtains the captured video data and performs analysis and processing to obtain the loss assessment images, the apparatus may further send the obtained loss assessment images to the server, and the server stores the loss assessment images or performs further loss assessment processing. Therefore, in other embodiments of the apparatus, if the captured video data of the damaged vehicle is obtained through the video recording, by the apparatus for obtaining a vehicle loss assessment image, the processor executes the instructions to further implement: transmitting the loss assessment image to a processing terminal in real time; or asynchronously transmitting the loss assessment image to a processing terminal.

Based on the descriptions that, for example, the loss assessment image is generated, and the damaged portion is located and tracked, of the foregoing method or apparatus embodiments, the apparatus for generating a loss assessment image on the client in the specification may further include other embodiments. For example, a video recording prompt message is displayed on a photographing terminal after being generated. Other embodiments describe loss assessment image type classification and identification, classification manners, and damaged portion positioning and tracking. Descriptions of related embodiments may be referenced to for details, which are not repeated herein.

A photographer may perform video recording of the damaged vehicle by using the apparatus for obtaining a vehicle loss assessment image provided in the specification, to capture video data; and then analyzes the captured video data to obtain candidate images of different types required for loss assessment. Further, the loss assessment images of the damaged vehicle may be generated from the candidate images. According to the embodiments of the specification, video recording can be performed on the client, and high-quality loss assessment images satisfying loss assessment processing requirements can be quickly obtained, thereby improving efficiency of obtaining loss assessment images, and also reducing costs of obtaining and processing loss assessment images by insurance company operators.

The methods or the apparatuses in the foregoing embodiments of the specification can implement task logic and record the task logic on a storage medium by using a computer program, and the storage medium may be readable and executable by a computer to achieve effects of the solutions described in the embodiments of the specification. Therefore, the specification further provides a computer-readable storage medium, the computer-readable storage medium stores computer instructions, and when the instructions are executed, the following steps can be implemented: receiving captured video data of a damaged vehicle; detecting video images in the captured video data to identify a damaged portion in the video images; classifying the video images based on the detected damaged portion to determine candidate image classification sets of the damaged portion; and selecting a vehicle loss assessment image from the candidate image classification sets according to a preset screening condition.

The specification further provides another computer-readable storage medium, the computer-readable storage medium stores computer instructions, and when the instructions are executed, the following steps are implemented: performing video recording of a damaged vehicle to obtain captured video data; sending the captured video data to a processing terminal; and receiving information of a region of a damaged portion that is obtained through real-time tracking of the damaged portion and that is returned by the processing terminal, and displaying the region, where the damaged portion is identified through detecting one or more video images in the captured video data by the processing terminal.

The computer-readable storage medium may include a physical apparatus configured to store information. Generally, the information is stored by using a medium in an electrical, magnetic, optical, or another form after the information is digitized. The computer-readable storage medium described in the embodiments may include: an apparatus that stores information by using electrical energy, for example, various types of memories such as a RAM and a ROM; an apparatus that stores information by using magnetic energy, for example, a hard disk, a floppy disk, a magnetic tape, a magnetic core memory, a bubble memory, or a USB flash drive; and an apparatus that optically stores information, for example, a CD or a DVD. Certainly, there may be readable storage medium in other forms, for example, a quantum memory, or a graphene memory.

The foregoing apparatuses, methods or computer-readable storage media may be applicable to a server for obtaining a vehicle loss assessment image, to obtain vehicle loss assessment images based on vehicle image videos. The server may be an independent server, or a system cluster including multiple application servers, or a server in a distributed system. In some embodiments, the server may include a processor and a memory configured to store instructions executable by the processor, and the processor executes the instructions to implement: receiving captured video data of a damaged vehicle that is uploaded by a terminal device; detecting video images in the captured video data to identify a damaged portion in the video image; classifying the video images based on the detected damaged portion to determine candidate image classification sets of the damaged portion; and selecting a vehicle loss assessment image from the candidate image classification sets according to a preset screening condition.

Figure 13:
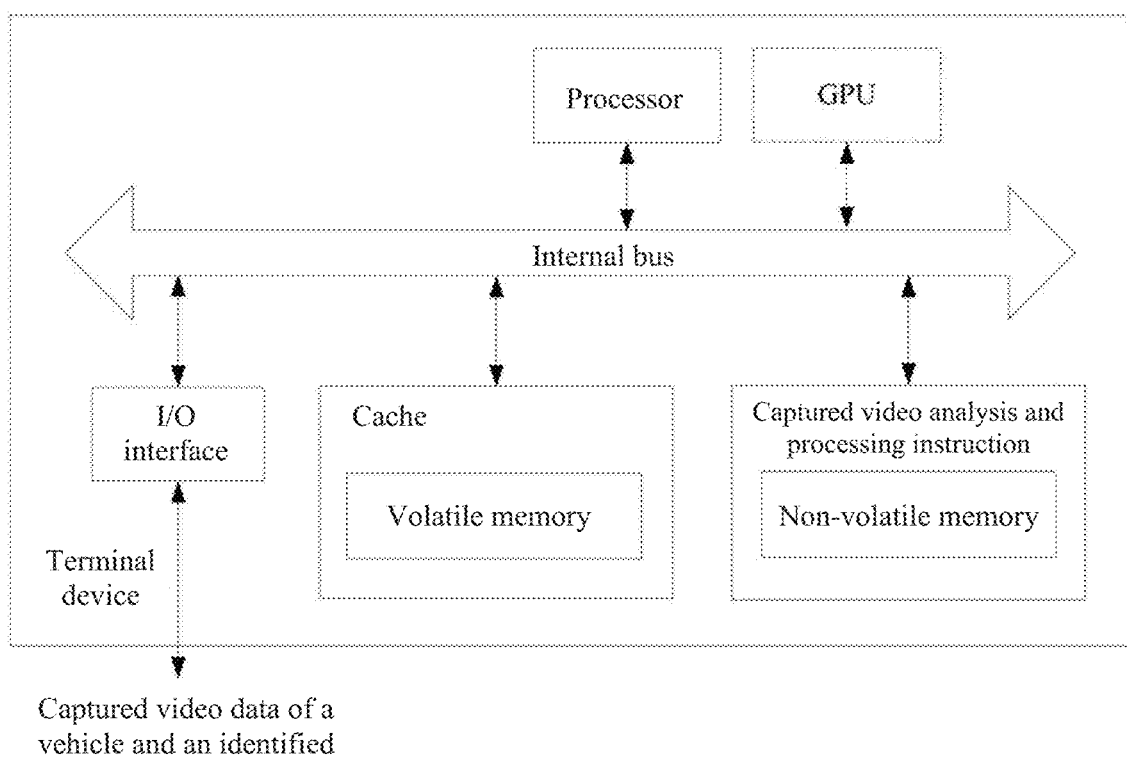
FIG. 13 is a schematic structural diagram of a terminal device according to some embodiments of the specification.

The foregoing apparatuses, methods or computer-readable storage media may be applicable to a terminal device for obtaining a vehicle loss assessment image, to obtain vehicle loss assessment images based on vehicle image videos. The terminal device may be implemented as a server, or may be implemented as a client that performs video recording of the damaged vehicle on the scene. FIG. 13 is a schematic structural diagram of a terminal device according to some embodiments of the specification. In an embodiment, the terminal device may include a processor and a memory configured to store instructions executable by the processor, and the processor executes the instructions to implement: obtaining video data captured through video recording of a damaged vehicle; detecting video images in the captured video data to identify a damaged portion in the video images; classifying the video images based on the detected damaged portion to determine candidate image classification sets of the damaged portion; and selecting a vehicle loss assessment image from the candidate image classification sets according to a preset screening condition.

The obtained captured video data may be data information uploaded after the terminal device obtains the captured video data, or may be video data captured by directly performing video recording of the damaged vehicle by the terminal device.

Further, if the terminal device is the client that performs video recording, the processor executes the instructions to further implement: transmitting the loss assessment image to a server in real time; or asynchronously transmitting the loss assessment image to a server.

A photographer may perform video recording of the damaged vehicle by using the terminal device for obtaining a vehicle loss assessment image provided in the specification, to capture video data, and then the client analyzes the captured video data and identifies the damaged portion, to obtain candidate images of different types required for loss assessment. Further, the loss assessment images of the damaged vehicle may be generated from the candidate images. According to the embodiments of the specification, video recording can be performed on the client, and high-quality loss assessment images satisfying loss assessment processing requirements can be quickly obtained, thereby improving efficiency of obtaining loss assessment images, and also reducing costs of obtaining and processing loss assessment images by insurance company operators.

Although the specification describes data model construction, data obtaining, interaction, calculation, determining, and the like, in the damaged region tracking manners, detecting the damaged portion and the vehicle component by using the CNN and the RPN, and the damaged portion-based image identification and classification, the specification is not limited to satisfying the industry communication standards, standard data models, computer processing and storage rules, or the embodiments described in the specification. Some industry standards or embodiments that have been slightly modified in a customized manner or based on the embodiments described in the specification can also achieve the same, equivalent, or similar effects as those of the foregoing embodiments, or predictable effects after the changes. Embodiments obtained after applying these modifications or changes to the data obtaining, storage, determining, and processing manners can still belong to the scope of embodiments of the specification.

In the 1990s, improvements of a technology can be clearly classified as hardware improvements (for example, improvements to a circuit structure such as a diode, a transistor, a switch, etc.) or software improvements (improvements to a method procedure). However, with the development of technologies, improvements of many method procedures can be considered as direct improvements of hardware circuit structures. Designers almost always program an improved method procedure to a hardware circuit, to obtain a corresponding hardware circuit structure. Therefore, it cannot be said that the improvement of a method procedure cannot be implemented by using a hardware entity module. For example, a programmable logic device (PLD) such as a field programmable gate array (FPGA) is a type of integrated circuit whose logic function is determined by a user's programming the device. The designers perform voluntary programming to "integrate" a digital system into a single PLD without requiring a chip manufacturer to design and prepare a dedicated integrated circuit chip. In addition, instead of making an integrated circuit chip manually, the programming is mostly implemented by using "logic compiler" software, which is similar to the software compiler used to write programs. Original code before being compiled is also written in a specific programming language, which is referred to as Hardware Description Language (HDL). There are many types of HDLs, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, Ruby Hardware Description Language (RHDL), etc. Currently, Very-High-Speed Integrated Circuit Hardware Description Language (VHDL) and Verilog are most commonly used. A person skilled in the art should also understand that as long as a method procedure is logically programmed and then programmed to an integrated circuit by using the foregoing hardware description languages, a hardware circuit that implements the logical method procedure can be easily obtained.

The controller can be implemented in any suitable manners, for example, the controller can take the form of, for example, a microprocessor or processor and a computer-readable medium storing computer-readable program code (for example, software or firmware) executable by the processor, a logic gate, a switch, an application-specific integrated circuit (ASIC), a programmable logic controller and an embedded microcontroller. Examples of the controller include, but are not limited to, the following microcontrollers: ARC 625D, Atmel AT91SAM, Microchip PIC18F26K20 and Silicone Labs C8051F320. The memory controller can also be implemented as part of the memory control logic. A person skilled in the art will also appreciate that, in addition to implementing the controller in the form of pure computer-readable program code, it is also possible to implement the controller in the form of a logic gate, switch, application-specific integrated circuit, programmable logic controller, and embedded microcontroller and other forms to achieve the same function. Such a controller can be considered as a hardware component and apparatuses included therein for implementing various functions can also be considered as structures inside the hardware component. Alternatively, apparatuses configured to implement various functions can be considered as both software modules implementing the method and structures inside the hardware component.

The systems, the apparatuses, the modules or the units described in the foregoing embodiments can be implemented by a computer chip or an entity or implemented by a product having a particular function. A typical device is a computer. The computer may be, for example, a personal computer, a laptop computer, an in-vehicle man-machine interactive device, a cellular phone, a camera phone, a smartphone, a personal digital assistant, a media player, a navigation device, an email device, a game console, a tablet computer, a wearable device, or a combination of any of the devices.

Although the specification provides method operation steps described in the embodiments or flowcharts, more or fewer operational steps operational steps may be included based on conventional means or non-creative means. The order of the steps listed in the embodiment is merely one of multiple step execution orders, and does not indicate the only execution order. When an actual apparatus or terminal product is executed, sequential execution or parallel execution may be performed according to the method orders shown in the embodiments or the accompany drawings (for example, in a parallel processor or multi-thread processing environment, and even a distributed data processing environment). The term "include," "comprise," or their any other variants is intended to cover a non-exclusive inclusion, so that a process, a method, a product, or a device that includes a series of elements not only includes such elements, but also includes other elements not expressly listed, or further includes elements inherent to such a process, method, product, or device. Unless otherwise indicated, other same or equivalent elements existing in the process, the method, the product, or the device that includes the elements are not excluded.

For ease of description, when a foregoing apparatus is described, the apparatus is divided into units according to functions described respectively. Certainly, in the embodiments of the specification, the functions of the modules may be implemented in a same piece of or multiple pieces of software and/or hardware, or modules implementing a same function may be implemented by using a combination of multiple submodules or subunits. For example, the foregoing described apparatus embodiments are merely examples. For example, the unit division is merely logical function division and may be other divisions in other embodiments. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

A person skilled in the art will also appreciate that, in addition to implementing the controller in the form of pure computer-readable program code, it is also possible to implement the controller in the form of a logic gate, switch, application-specific integrated circuit, programmable logic controller, and embedded microcontroller and other forms to achieve the same function. Such a controller can be considered as a hardware component and apparatuses included therein for implementing various functions can also be considered as structures inside the hardware component. Alternatively, apparatuses configured to implement various functions can be considered as both software modules implementing the method and structures inside the hardware component.

The application is described with reference to the flowcharts and/or block diagrams of the methods, the devices (systems), and the computer program products according to the embodiments of the specification. It should be understood that computer program instructions may be used for implementing each process and/or each block in the flowcharts and/or the block diagrams and a combination of a process and/or a block in the flowcharts and/or the block diagrams. These computer program instructions may be provided to a general-purpose computer, a dedicated computer, an embedded processor, or a processor of another programmable data processing device to generate a machine, so that the instructions executed by the computer or the processor of the other programmable data processing device generate an apparatus for implementing a specific function in one or more processes in the flowcharts and/or in one or more blocks in the block diagrams.

These computer program instructions may alternatively be stored in a computer-readable memory that can instruct the computer or the other programmable data processing device to work in a manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto the computer or the other programmable data processing device, so that a series of operations and steps are performed on the computer or the other programmable device, thereby generating computer-implemented processing. Therefore, the instructions executed on the computer or the other programmable device provide steps for implementing a function in one or more processes in the flowcharts and/or in one or more blocks in the block diagrams.

In a typical configuration, a computing device includes one or more processors (CPU), an input/output interface, a network interface, and a memory.

The memory may include, among computer-readable media, a volatile memory such as a random access memory (RAM) and/or a non-volatile memory such as a read-only memory (ROM) or a flash memory (flash RAM). The memory is an example of the computer-readable medium.

The computer-readable medium includes non-volatile, volatile, movable, and unmovable media that may implement information storage by using any method or technology. Information may be a computer-readable instruction, a data structure, a program module, or other data. Examples of computer storage media include but are not limited to a phase change memory (PRAM), a static random access memory (SRAM), a dynamic random access memory (DRAM), other type of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette magnetic tape, tape and disk storage or other magnetic storage device or any other non-transmission media that may be configured to store information that a computing device can access. Based on the description in the specification, the computer-readable medium does not include transitory computer-readable media (transitory media), such as a modulated data signal and a carrier.

A person skilled in the art should understand that the embodiments of the specification may be provided as a method, a system, or a computer program product. Therefore, the specification may use a form of hardware only, software only, or a combination of software and hardware. Moreover, the specification may use a form of a computer program product that is implemented on one or more computer-usable storage media (including but not limited to a disk memory, a CD-ROM, an optical memory, and the like) that include computer-usable program code.

The specification can be described in the general context of computer executable instructions executed by a computer, for example, a program module. Generally, the program module includes a routine, a program, an object, a component, a data structure, and the like for executing a particular task or implementing a particular abstract data type. The specification can also be practiced in a distributed computing environment in which tasks are performed by remote processing devices that are connected through a communication network. In a distributed computing environment, the program module may be located in both local and remote computer storage media including storage devices.

The embodiments of the specification are described in a progressive manner. For same or similar parts in the embodiments, refer to these embodiments. Each embodiment focuses on a difference from other embodiments. Especially, a system embodiment is basically similar to a method embodiment, and therefore is described briefly; for related parts, refer to partial descriptions in the method embodiment. In the descriptions of this specification, descriptions of a reference term such as "an embodiment," "some embodiments," "an example," "a specific example," or "some examples" means that a feature, structure, material, or characteristic that is described with reference to the embodiment or the example is included in at least one embodiment or example of the specification. In this specification, schematic descriptions of the foregoing terms do not necessarily directed at a same embodiment or example. Besides, the described feature, the structure, the material, or the characteristic may be combined in a proper manner in any one or more embodiments or examples. In addition, if not mutually contradictory, a person skilled in the art can combine or group different embodiments or examples that are described in this specification as well as features of the different embodiments or examples.

The foregoing descriptions are merely embodiments of the specification, and are not intended to limit the specification. For a person skilled in the art, various modifications and changes may be made to the specification. Any modifications, equivalent replacements, improvements, and the like made within the spirit and principle of the specification shall fall within the scope of the claims of the specification.

What is claimed is:

1. A computer-implemented method for obtaining a vehicle loss assessment image comprising:
    receiving video data of a damaged vehicle;
    detecting a plurality of video images in the video data to identify a damaged portion in the plurality of video images;
    classifying one or more video images of the plurality of video images into each of one or more candidate image classification sets of the damaged portion based on the identified damaged portion, wherein the one or more candidate image classification sets comprise a close-up image set including one or more video images displaying the damaged portion and a component image set including one or more video images displaying a vehicle component to which the damaged portion belongs; and
    selecting a vehicle loss assessment image from the one or more candidate image classification sets according to a screening condition,
    wherein classifying the one or more video images into the close-up image set comprises:
        sorting video images including the damaged portion in a descending order of areas of a same damaged portion in the video images; and
        selecting, from the sorted video images, first one or more video images or one or more video images in each of which a ratio of an area of the damaged portion to an area of the corresponding video image is greater than a threshold ratio.

2. The computer-implemented method for obtaining a vehicle loss assessment image according to claim 1, wherein the threshold ratio is a first threshold ratio, and classifying one or more video images into the close-up image set further comprises:
    in response to determining that a ratio of an area of the damaged portion to that of a video image including the damaged portion is greater than a second threshold ratio, classifying the video image into the close-up image set.

3. The computer-implemented method for obtaining a vehicle loss assessment image according to claim 1, wherein the threshold ratio is a first threshold ratio, and classifying one or more video images into the close-up image set further comprises:

in response to determining that a ratio of a horizontal coordinate span of the damaged portion to a length of a video image including the damaged portion is greater than a second threshold ratio, and/or a ratio of a longitudinal coordinate span of the damaged portion to a height of the video image including the damaged portion is greater than a third threshold ratio, classifying the video image into the close-up image set.

4. The computer-implemented method for obtaining a vehicle loss assessment image according to claim 1, further comprising:

in response to detecting that at least one of the close-up image set and the component image set of the damaged portion is empty, or the one or more video images in the close-up image set do not cover the entire damaged portion, generating a video recording prompt message; and sending the video recording prompt message to a terminal device that obtains the video data.

5. The computer-implemented method for obtaining a vehicle loss assessment image according to claim 1, further comprising:

tracking the damaged portion in the video data in real time to determine a region of the damaged portion in the video images; and in response to the damaged portion being out of a video image and subsequently re-entering a video image, tracking the damaged portion again to determine a new region of the damaged portion in the video image based on image feature data of the damaged portion.

6. The computer-implemented method for obtaining a vehicle loss assessment image according to claim 5, further comprising:

sending information of the region of the tracked damaged portion to a terminal device for the terminal device to display the region of the damaged portion in real time.

7. The computer-implemented method for obtaining a vehicle loss assessment image according to claim 6, further comprising:

receiving new information of the damaged portion, wherein the new information of the damaged portion is determined in response to the terminal device's changing the region of the damaged portion based on a received interactive instruction; and classifying the video images based on the new information of the damaged portion.

8. The computer-implemented method for obtaining a vehicle loss assessment image according to claim 1, wherein selecting a vehicle loss assessment image from the one or more candidate image classification sets according to a screening condition comprises:

selecting at least one video image as a loss assessment image of the damaged portion from the one or more candidate image classification sets according to clarity of the video images and filming angles of the damaged portion in the video images.

9. The computer-implemented method for obtaining a vehicle loss assessment image according to claim 1, further comprising:

in response to detecting that there are at least two damaged portions in the one or more video images, determining whether a distance between the at least two damaged portions satisfies a proximity condition; and in response to determining that the distance between the at least two damaged portions satisfies the proximity condition, simultaneously tracking the at least two damaged portions, and obtaining loss assessment images of the at least two damaged portions.

10. An apparatus for obtaining a vehicle loss assessment image, comprising one or more processors and one or more non-transitory computer-readable memories coupled to the one or more processors and configured with instructions executable by the one or more processors to cause the apparatus to perform operations comprising:

receiving video data of a damaged vehicle;

detecting a plurality of video images in the video data to identify a damaged portion in the plurality of video images;

classifying one or more video images of the plurality of video images into each of one or more candidate image classification sets of the damaged portion based on the identified damaged portion, wherein the one or more candidate image classification sets comprise a close-up image set including one or more video images displaying the damaged portion and a component image set including one or more video images displaying a vehicle component to which the damaged portion belongs; and selecting a vehicle loss assessment image from the one or more candidate image classification sets according to a screening condition, wherein classifying the one or more video images into the close-up image set comprises:

sorting video images including the damaged portion in a descending order of areas of a same damaged portion in the video images; and selecting, from the sorted video images, first one or more video images or one or more video images in each of which a ratio of an area of the damaged portion to an area of the corresponding video image is greater than a threshold ratio.

11. The apparatus for obtaining a vehicle loss assessment image according to claim 10, wherein the threshold ratio is a first threshold ratio, and classifying one or more video images into the close-up image set further comprises:

in response to determining that a ratio of an area of the damaged portion to that of a video image including the damaged portion is greater than a second threshold ratio, classifying the video image into the close-up image set.

12. The apparatus for obtaining a vehicle loss assessment image according to claim 10, wherein the threshold ratio is a first threshold ratio, and classifying one or more video images into the close-up image set further comprises:

in response to determining that a ratio of a horizontal coordinate span of the damaged portion to a length of a video image including the damaged portion is greater than a second threshold ratio, and/or a ratio of a longitudinal coordinate span of the damaged portion to a height of the video image including the damaged portion is greater than a third threshold ratio, classifying the video image into the close-up image set.

13. The apparatus for obtaining a vehicle loss assessment image according to claim 10, wherein the operations further comprise:

in response to detecting that at least one of the close-up image set and the component image set of the damaged portion is empty, or the one or more video images in the close-up image set do not cover the entire damaged portion, generating a video recording prompt message; and sending the video recording prompt message to a terminal device that obtains the video data.

14. The apparatus for obtaining a vehicle loss assessment image according to claim 10, wherein the operations further comprise:

tracking the damaged portion in the video data in real time to determine a region of the damaged portion in the video images; and in response to the damaged portion being out of a video image and subsequently re-entering a video image, tracking the damaged portion again to determine a new region of the damaged portion in the video image based on image feature data of the damaged portion.

15. The apparatus for obtaining a vehicle loss assessment image according to claim 14, wherein the operations further comprise:

sending information of the region of the tracked damaged portion to a terminal device for the terminal device to display the region of the damaged portion in real time.

16. A non-transitory computer-readable storage medium configured with instructions executable by one or more processors to cause the one or more processors to perform operations comprising:

receiving video data of a damaged vehicle;

detecting a plurality of video images in the video data to identify a damaged portion in the plurality of video images;

classifying one or more video images of the plurality of video images into each of one or more candidate image classification sets of the damaged portion based on the identified damaged portion, wherein the one or more candidate image classification sets comprise a close-up image set including one or more video images displaying the damaged portion and a component image set including one or more video images displaying a vehicle component to which the damaged portion belongs; and selecting a vehicle loss assessment image from the one or more candidate image classification sets according to a screening condition, wherein classifying the one or more video images into the close-up image set comprises:

sorting video images including the damaged portion in a descending order of areas of a same damaged portion in the video images; and selecting, from the sorted video images, first one or more video images or one or more video images in each of which a ratio of an area of the damaged portion to an area of the corresponding video image is greater than a threshold ratio.

17. The non-transitory computer-readable storage medium according to claim 16, wherein the preset ratio is a first preset ratio, and classifying one or more video images into the close-up image set further comprises:

in response to determining that a ratio of an area of the damaged portion to that of a video image including the damaged portion is greater than a second preset ratio, classifying the video image into the close-up image set.

18. The non-transitory computer-readable storage medium according to claim 16, wherein the preset ratio is a first preset ratio, and classifying one or more video images into the close-up image set further comprises:

in response to determining that a ratio of a horizontal coordinate span of the damaged portion to a length of a video image including the damaged portion is greater than a second preset ratio, and/or a ratio of a longitudinal coordinate span of the damaged portion to a height of the video image including the damaged portion is greater than a third preset ratio, classifying the video image into the close-up image set.

19. The non-transitory computer-readable storage medium according to claim 16, wherein the operations further comprise:

in response to detecting that at least one of the close-up image set and the component image set of the damaged portion is empty, or the one or more video images in the close-up image set do not cover the entire damaged portion, generating a video recording prompt message; and sending the video recording prompt message to a terminal device that obtains the video data.

20. The non-transitory computer-readable storage medium according to claim 16, wherein the operations further comprise:

tracking the damaged portion in the video data in real time to determine a region of the damaged portion in the video images; and in response to the damaged portion being out of a video image and subsequently re-entering a video image, tracking the damaged portion again to determine a new region of the damaged portion in the video image based on image feature data of the damaged portion.

* * * * *